United States Patent [19]

Lahti et al.

[11] Patent Number: 5,715,077
[45] Date of Patent: Feb. 3, 1998

[54] MULTI-MODE INFRARED INPUT/OUTPUT INTERFACE

[75] Inventors: Gregg D. Lahti; Franklyn H. Story, both of Chandler, Ariz.

[73] Assignee: VLSI Technology, Inc., San Jose, Calif.

[21] Appl. No.: 308,328

[22] Filed: Sep. 19, 1994

[51] Int. Cl.$^6$ .................................................. H04B 10/16
[52] U.S. Cl. .......................... 359/176; 359/152; 359/181
[58] Field of Search .............................. 395/834; 359/135, 359/110, 137, 148, 152, 161, 176, 181, 189, 145

[56] References Cited

U.S. PATENT DOCUMENTS

| | | | |
|---|---|---|---|
| 5,142,398 | 8/1992 | Heep | 359/148 |
| 5,182,543 | 1/1993 | Siegel et al. | 340/531 |
| 5,519,526 | 5/1996 | Chua et al. | 359/152 |
| 5,528,409 | 6/1996 | Cucci et al. | 359/152 |
| 5,546,211 | 8/1996 | Devon | 359/154 |
| 5,557,751 | 9/1996 | Banman et al. | 395/250 |
| 5,585,953 | 12/1996 | Zavrel | 359/145 |

OTHER PUBLICATIONS

Kevin W. Bartig, "HP95LX Wired Serial and Infrared I/O External Reference Specification", Hewlett Packard Co., Apr. 1991, pp. 13, 14.

*Primary Examiner*—Leslie Pascal
*Attorney, Agent, or Firm*—Douglas L. Weller

[57] ABSTRACT

A multi-mode infrared interface allows for the selection of an encoding mode from a plurality of modes for infrared light transmission. When there is a transmission, an outgoing serial data stream is produced. The infrared interface transmits the serial data stream by infrared light using the selected mode. For example, a first mode is serial data stream transmission where an IR light pulse is transmitted for each bit of data having a first value. A second mode is modulated serial data stream transmission where a modulated IR light pulse is transmitted for each bit of data having a first value. A third mode is REDEYE transmission using the HP Redeye "REDEYE" format. A fourth mode uses a format defined by a user in software.

15 Claims, 11 Drawing Sheets

MULTI-MODE INFRARED INPUT/OUTPUT INTERFACE

BACKGROUND

The present invention concerns a multi-mode infrared input/output (I/O) interface.

Various interfaces are used for communication between devices. For example, the MC550 Universal Asynchronous Receiver Transmitter (UART) format is used to provide serial data transmission between devices. Infrared (IR) light beams are often used to provide a wireless transfer of information between devices. Various protocols for IR interface devices exist. For example, IR transmissions may use a standard serial data stream transmission or a REDEYE format.

SUMMARY OF THE INVENTION

In accordance with the preferred embodiment of the present invention, a multi-mode infrared interface is presented. The infrared interface allows for the selection of an encoding mode from a plurality of modes for infrared light transmission. When there is a transmission, an outgoing serial data stream is produced. The infrared interface transmits the serial data stream by infrared light using the selected mode. For example, a first mode is serial data stream transmission where an IR light pulse is transmitted for each bit of data having a first value. A second mode is modulated serial data stream transmission where a modulated IR light pulse is transmitted for each bit of data having a first value (e.g., each bit having a value of "0"). A third mode is REDEYE transmission using the HP Redeye "RED-EYE" format. A fourth mode uses a format defined by a user in software.

The present invention allows versatile infrared transmission using a single interface.

DESCRIPTION OF THE PREFERRED EMBODIMENT

Figure 1:
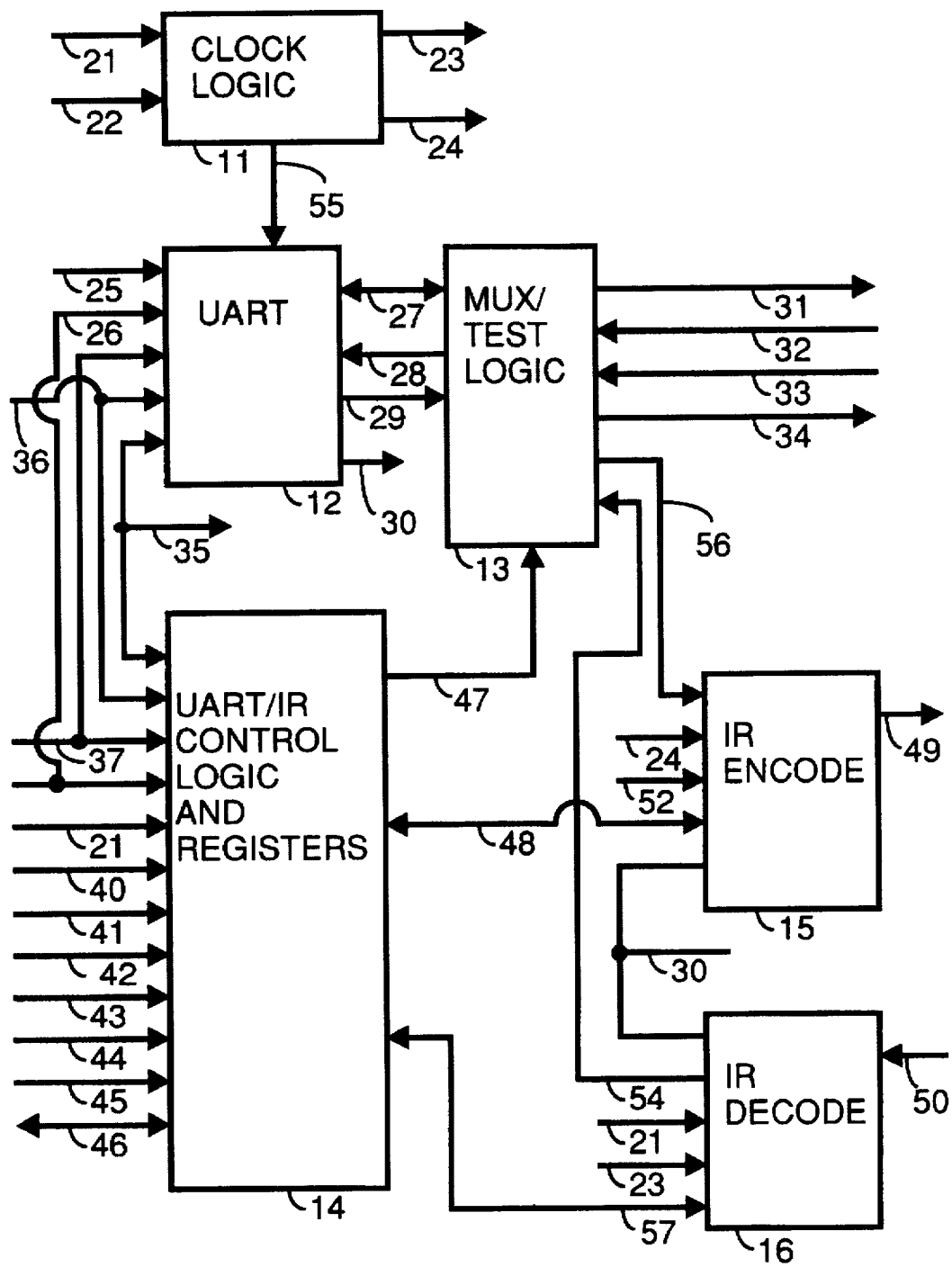
FIG. 1 shows a block diagram of an infrared/serial port interface in accordance with the preferred embodiment of the present invention.

FIG. 1 shows a block diagram of an infrared (IR)/serial port interface in accordance with the preferred embodiment of the present invention. The IR/serial port interface provides communication using four modes of transmission for IR transmission: (1) standard serial data stream transmission, (2) IR transmission using HP redeye (REDEYE) transmission-only format, (3) modulated serial data stream transmission, and (4) a software-controlled, user-defined format for transmission.

The interface includes clock logic circuitry 11, UART circuitry 12, multiplexor/test logic circuitry 13, UART/IR control logic and registers 14, IR encode circuitry 15 and IR decode circuitry 16.

Clock logic circuitry 11 receives a fourteen megahertz clock signal 21 and a clock disable signal 22. Clock logic circuitry 11 generates a one megahertz clock signal 23 and a five hundred kilohertz clock signal 24. Clock logic circuitry 11 also generates a baud clock signal 55 used by UART circuitry 12. Clock disable signal 22 is used to disable the clock generation by clock logic circuitry 11 for power management.

UART circuitry 12 is a standard MC550 UART megacell, available from VLSI Technology, Inc., having a business address of 1109 McKay Drive San Jose, Calif. 95131. UART circuitry 12 receives a three bit address signal 25, an I/O read line 26, an I/O write line 37 and a UART control signal 36. UART control signal 36 is an enable to allow the UART to look (or qualify) the read/write operations, analogous to a safety switch. UART circuitry 12 also receives information on the eight low order bits of a sixteen bit data bus 35. Data bus 35 is indirectly connected to the processor/CPU that controls it. Thus information is transferred between the processor/CPU and UART circuitry 12 via data bus 35. UART circuitry 12 generates modem control signals 27, an eight bit output data bus signal 29 and a receive clock (R clock) signal 30 which is sixteen times faster than baud clock signal 55. UART circuitry 12 receives a serial in signal 28.

Multiplexor/test logic circuitry 13 controls how UART circuitry 12 is interfaced for various modes. For a test mode, the internal UART connections are multiplexed out as test signals to external pads for functional system clock testing.

When the UART mode is enabled, multiplexor/test logic circuitry 13 connects serial out signal 29 to serial transmit signal 34 and connects a serial receive signal 33 to serial in signal 28. Modem control signals 27 are connected directly to the modem control I/O signals 31 and 32. The UART receive/transmit signals function as a normal UART rather than being connected to the IR interface block.

When the IR interface is enabled, the modem control signals 31 are set so that a read of the modem status register will be 0×30. The serial out signal 29 is routed to IR encode circuitry 15 on line 56. Line 54 from IR decode circuitry is routed to the serial in signal 28. This enables the IR interface.

UART control logic and registers 14 contains various register blocks and functional blocks. UART control logic and registers 14 receives I/O read line 26, I/O write line 37, UART control signal 36, fourteen megahertz clock signal 21, a UART control signal 40, an IR control signal 41, a shadow register (SFCRA) control signal 42, an IR format control signal 43, an IR count control signal 43, a test mode signal 45 and test signals 46. UART control signal 40, IR control signal 41, shadow register control signal 42, IR format control signal 43, and IR count control signal 43 are used to select a register within UART/IR control logic.

UART control logic and registers 14 generates control signals 47 for multiplexor/test logic circuitry 13. UART control logic and registers 14 exchanges control signals 48 with IR encode circuitry 15 and exchanges control signals 57 with IR decode circuitry 16.

When the IR interface is enabled, IR encode circuitry 15 generates an IR out signal 49 which is forwarded to an IR diode. When enabled, IR encode logic 14 receives the serial out signal 29 routed to IR encode circuitry 15 on line 56. IR encode logic 15 exchanges control signals 48 with UART control logic and registers 14. IR encode circuitry 14 also receives five hundred kilohertz clock signal 24, a 32 kilohertz clock signal 52 and R clock signal 30.

When the IR interface is enabled, IR decode circuitry 16 receives an IR input signal 50 from the IR diode which is forwarded to multiplexor test logic 13 on line 54. IR decode circuitry 16 exchanges control signals 57 with UART control logic and registers 14. IR decode circuitry also receives fourteen megahertz clock signal 21, one megahertz clock signal 23 and R clock 30.

Figure 2:
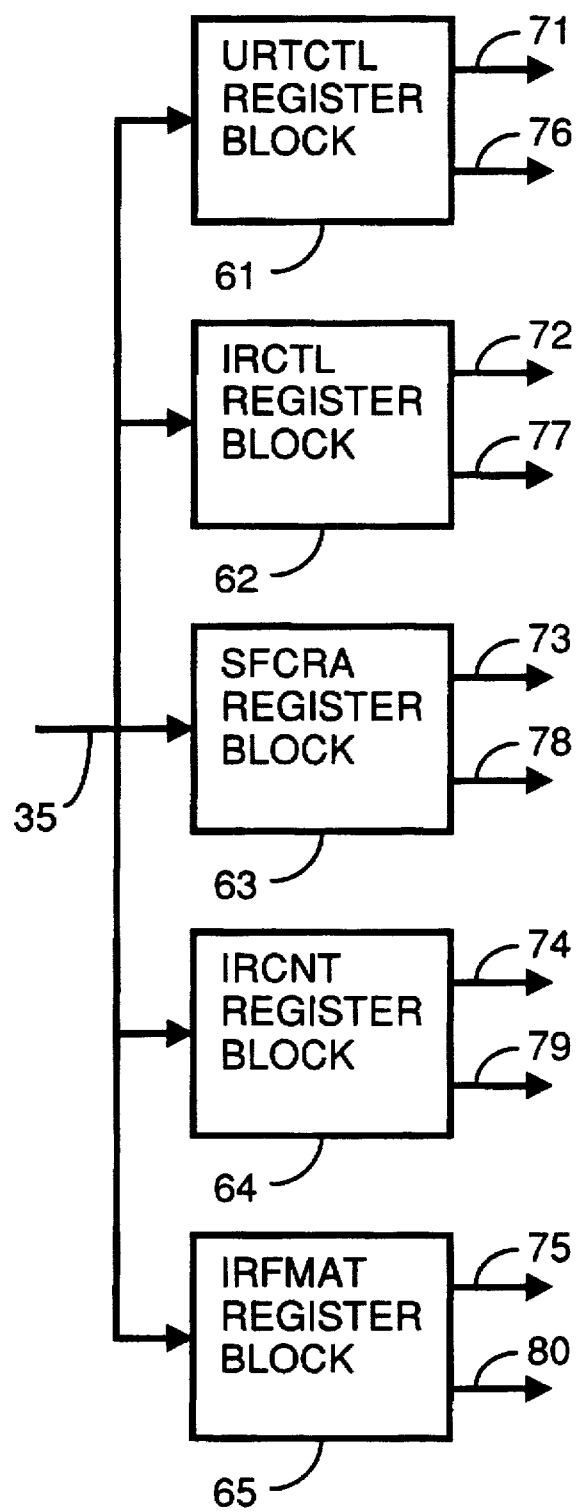
FIG. 2 shows a block diagram of registers used for the infrared/serial port interface shown in FIG. 1, in accordance with the preferred embodiment of the present invention.

FIG. 2 shows register control blocks within UART control logic and registers 14. UART control (URTCTL) register block 61 contains the latches and flip-flops used to write/read incoming UART configuration data to/from data bus 35. UART control register block 61 generates a sixteen bit data output bus signal 76 and various address and control signals 71. Address and control signals 71 includes a thirteen bit IR base register, an IR/serial mode signal and a baud rate control signal. The IR base register is used by the software to put the location (I/O address-mapped) of the UART control registers to anywhere within the I/O addressable space. The IR serial mode signal sets the IR control logic to enable it to decode IR serial formats. The baud rate control signal (BD2X) is a signal which tells the logic to use a "doubled" or sped up clock.

IR control (IRCTL) register block 62 contains the latches and flip-flops used to write/read incoming IR configuration data to/from data bus 35. IR control register block 62 generates a sixteen bit data output bus signal 77 and various control signals 72.

Shadow (SFCRA) register block 63 contains the latches and flip-flops used to catch the incoming UART configuration when writing to the first-in-first-out (FIFO) control register (address 0x2) of UART circuitry 12. This acts as a shadow register so that software will be able to detect what was written to the FIFO control register by reading shadow register 63. Shadow register block 63 generates a sixteen bit data output bus signal 78 and various control signals 73.

IR count (IRCNT) register block 64 contains the latches and flip-flops used to write/read incoming IR control data to/from data bus 35. The IR Input (IRI) and IR event (IRE) status bits are processed in this block, as well as writing to the LED buffer register (LBR) when in IR transmission mode. A one bit FIFO for the IR transmission mode is accomplished in an LBR and FIFO logic block within IR count register block 64. In the LBR and FIFO logic block a state machine decodes when in IR transmission mode and a write to the LBR has occurred. If no transmit operation is being currently proceed, the state machine sends the bit value to IR encode circuitry 15 and starts the IR transmission. If a transmit operation is underway, the state machine holds the LED buffer full (LBF) bit to "1" and waits until the transmission is finished before it will send the LBR value to the IR encode circuitry 15 and start a new transmission. The interrupt handling when the LBR is transferred to the IR encode circuitry 15 is also accomplished in IR count register block 64. IR count register block 64 generates a sixteen bit data output bus signal 79 and various control signals 74.

IR format (IRFMT) register block 65 contains the latches and flip-flops used to write/read incoming IR formatting data to/from data bus 35. IR format (IRFMT) register block 65 also processes the line buffer full signal. IR format (IRFMT) register block 65 generates a sixteen bit data output bus signal 80 and various control signals 75.

Figure 3:
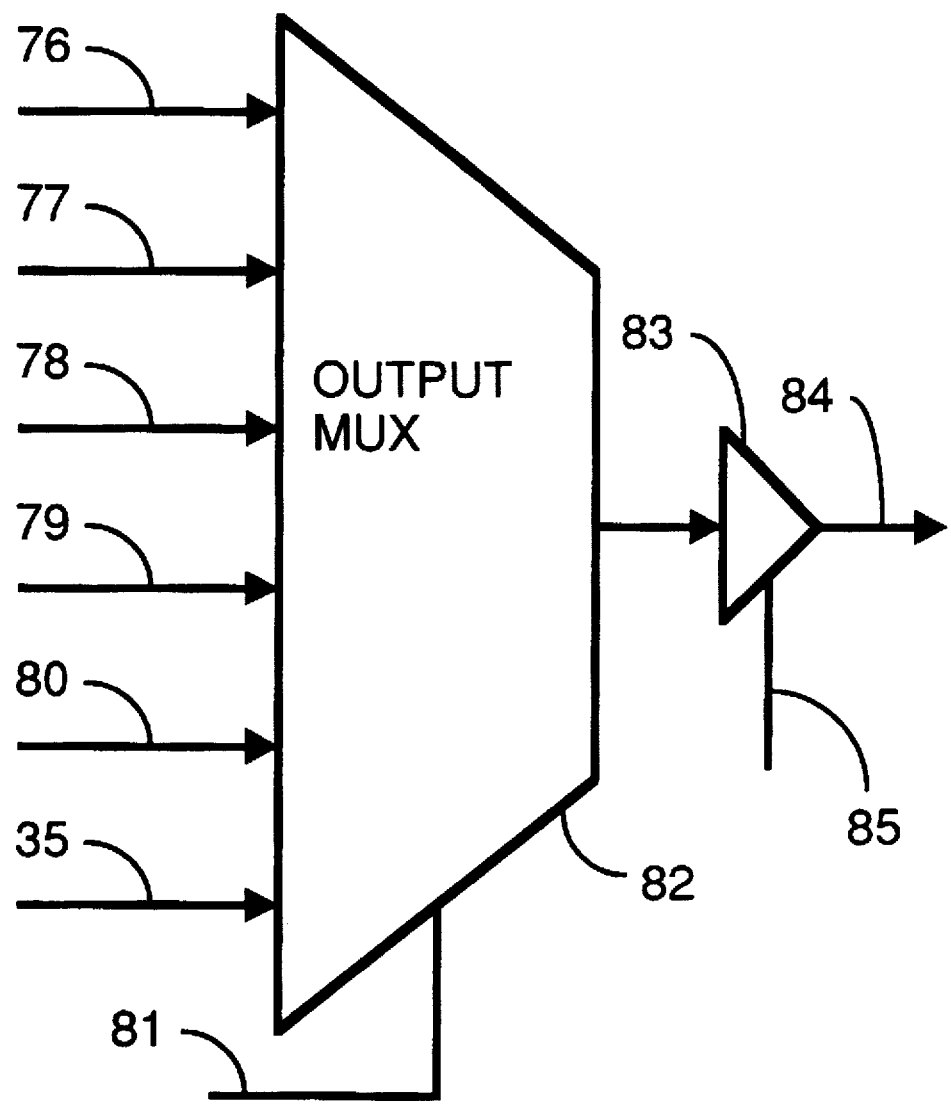
FIG. 3 shows a block diagram of an output multiplexor used for the infrared/serial port interface shown in FIG. 1, in accordance with the preferred embodiment of the present invention.

A multiplexing operation is performed by a two-stage bank of output enabled tri-state buffers and a bank of bus keepers. This allows the data to be transferred to data bus 35 using only one bus driver. This is performed, for example, using an output multiplexor 82, shown in FIG. 3. Multiplexor 82, is used to select an output from one of sixteen bit data output bus signals 76 through 80 or UART data out from the eight low order bits of sixteen bit data bus 35. Control lines 81 are decoded read selects to the register blocks within UART control logic and registers 14. Bus drivers 83 are controlled by a logic OR of all the read selects, placed on a control line 85.

Figure 4:
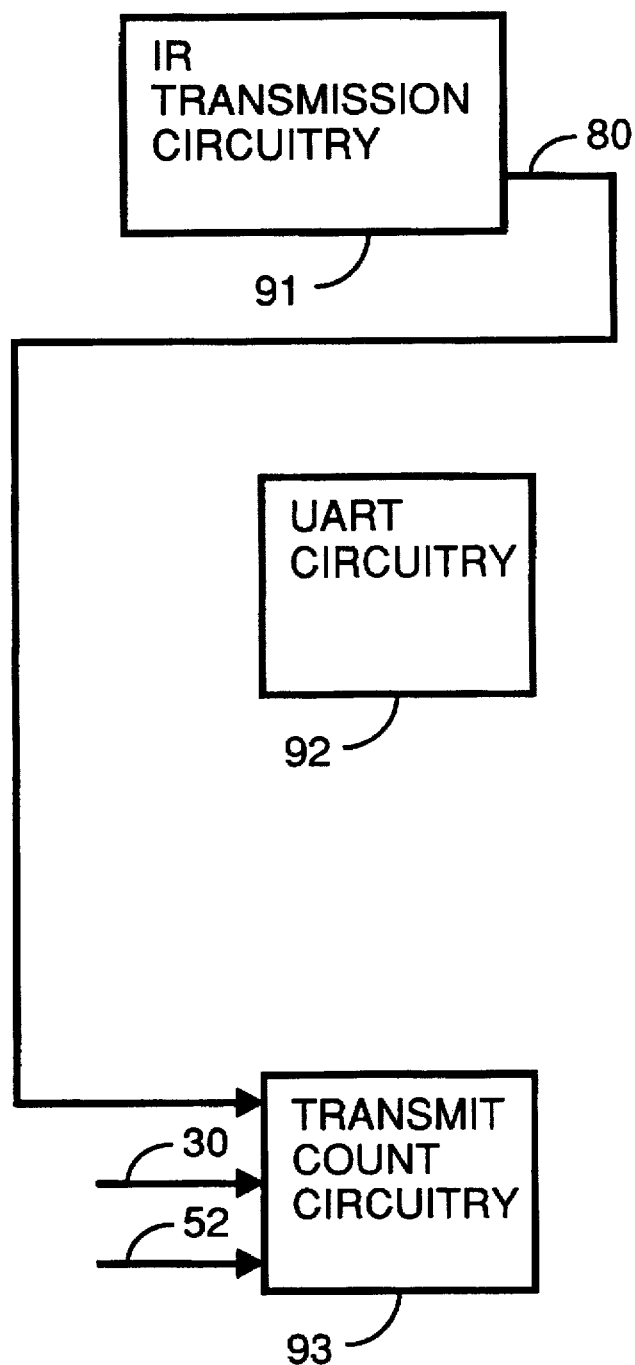
FIG. 4 shows a block diagram of encode circuitry within the infrared/serial port interface shown in FIG. 1 in accordance with the preferred embodiment of the present invention.

IR encode circuitry 15 contains logic to encode an IR transmission from a serial stream, from an IR transmit stream or from a modulated data stream. FIG. 4 shows IR encode circuitry 15 to include IR transmission circuitry 91, UART circuitry 92 and transmit count circuitry 93. IR transmission circuitry 91 encodes an IR transmission for the REDEYE format. IR transmission circuitry 91 includes a state machine. The state machine starts a bit counter and counts eight pulses. A redeye_out signal needs to be set before pulses will be sent out as IR out signal 49.

UART circuitry 92 includes serial-transfer encoder circuitry which utilizes a sixteen bit counter to determine the frame and generate a three-sixteenths pulse. This means that over a frame of sixteen clocks wide, the output pulse to the IR diode is three clocks wide (3/16 pulse width. For a modulated output, a logic AND is performed between the enable signal and the modulation frequency.

Transmit count circuitry 93 contains a sixteen bit counter used in the encoder logic. This counter is clocked either by R clock signal 30 or by 32 kilohertz clock signal 52.

IR decode circuitry 16 decodes the incoming IR transmission according to specific bits set in IR control register 62 and IR count register 64.

Figure 5:
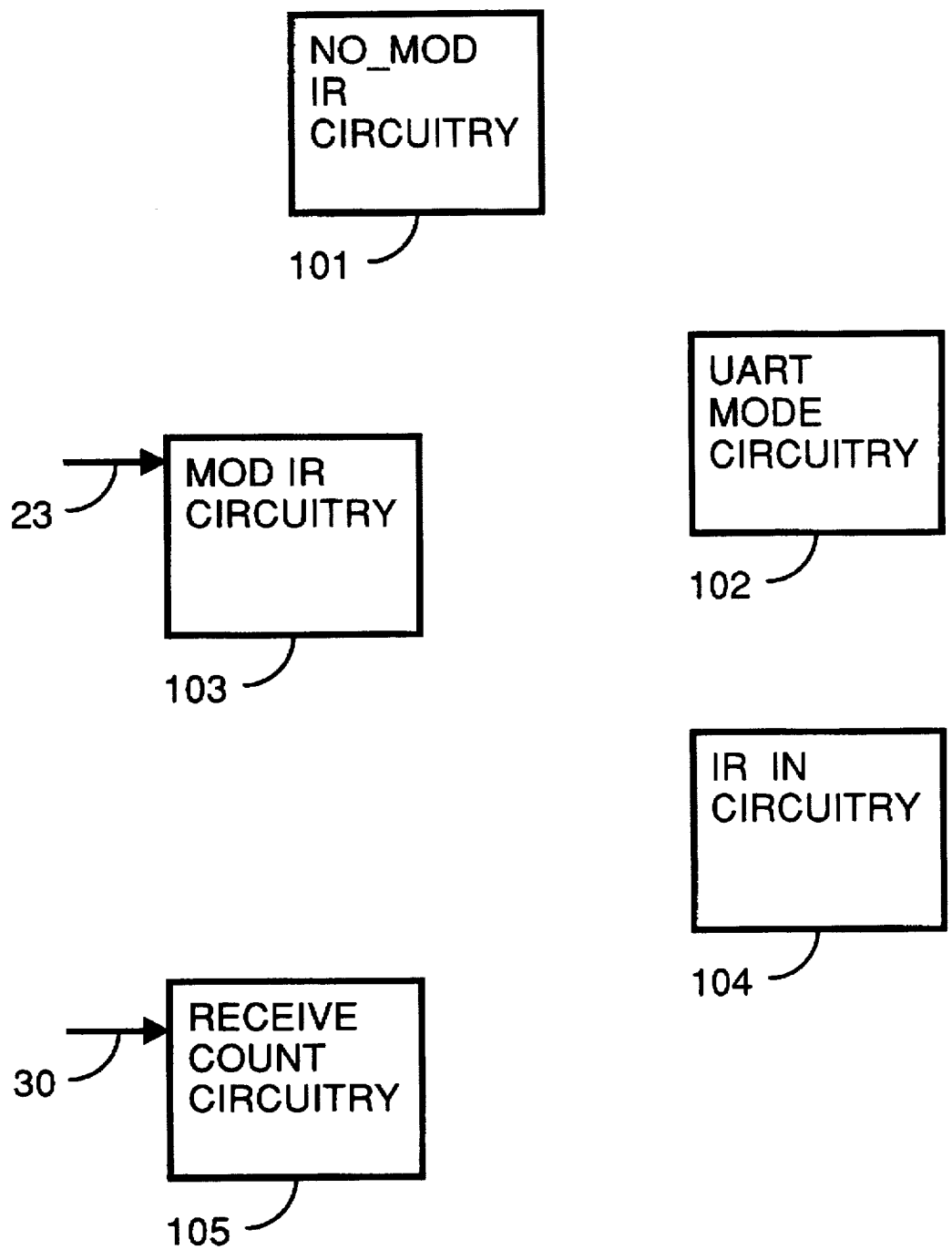
FIG. 5 shows a block diagram of decode circuitry within the infrared/serial port interface shown in FIG. 1 in accordance with the preferred embodiment of the present invention.

As shown in FIG. 5, IR decode circuitry 16 includes no modulation IR circuitry 101, UART mode circuitry 102, modulation IR circuitry 103, IR in circuitry 104 and receive count circuitry 105. No modulation IR circuitry 101, on the basis of an enable signal, determines if the input should forwarded to multiplexor/test logic 13 without processing. Modulation IR circuitry 103 decodes the 500 kilohertz modulated input stream. If there is a 500 kilohertz modulation signal, the output of line 54 of the IR decode circuitry 16 is at logic one. Modulation IR circuitry 103 uses two synchronizing flip-flops and a four stage decoder based on the one megahertz clock signal 23 for two times sampling.

UART mode circuitry 102 synchronizes the IR input and starts a counter when an input edge is detected. Based upon the count, UART mode circuitry 102 stretches the incoming pulse to sixteen clocks wide and outputs the inverted signal to the UART. When sixteen clocks are counted, the counter is reset and UART mode circuitry 102 waits for the next incoming pulse.

IR in circuitry 104 detects an incoming edge or low-to-high transition. In the preferred embodiment, IR in circuitry 104 assumes that the signal from the IR receiver diode is glitch free.

Receive count circuitry 105 contains counter logic for IR decode circuitry 16. Receive count circuitry 105 is clocked by R clock 30.

Figure 6:
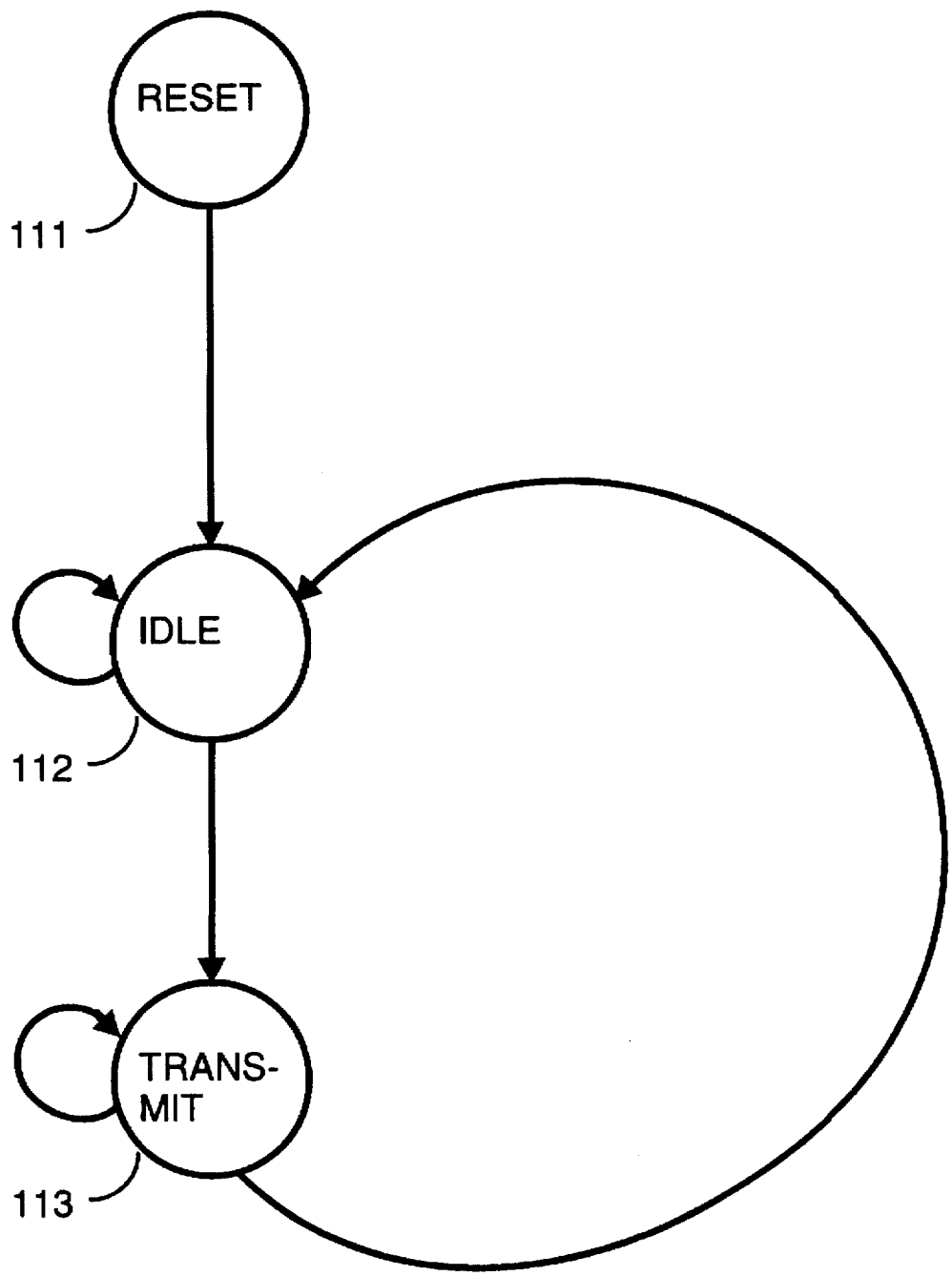
FIG. 6 shows a state diagram used by a state machine within encode circuitry shown in FIG. 4 in accordance with the preferred embodiment of the present invention.

FIG. 6 shows a state diagram for the state machine within IR transmission circuitry 91. When reset, IR transmission circuitry 91 is in a reset state 111. When waiting to transmit, IR transmission circuitry 91 is in an idle state 112. When transmitting, IR transmission circuitry 91 is in a transmit state 113.

Figure 7:
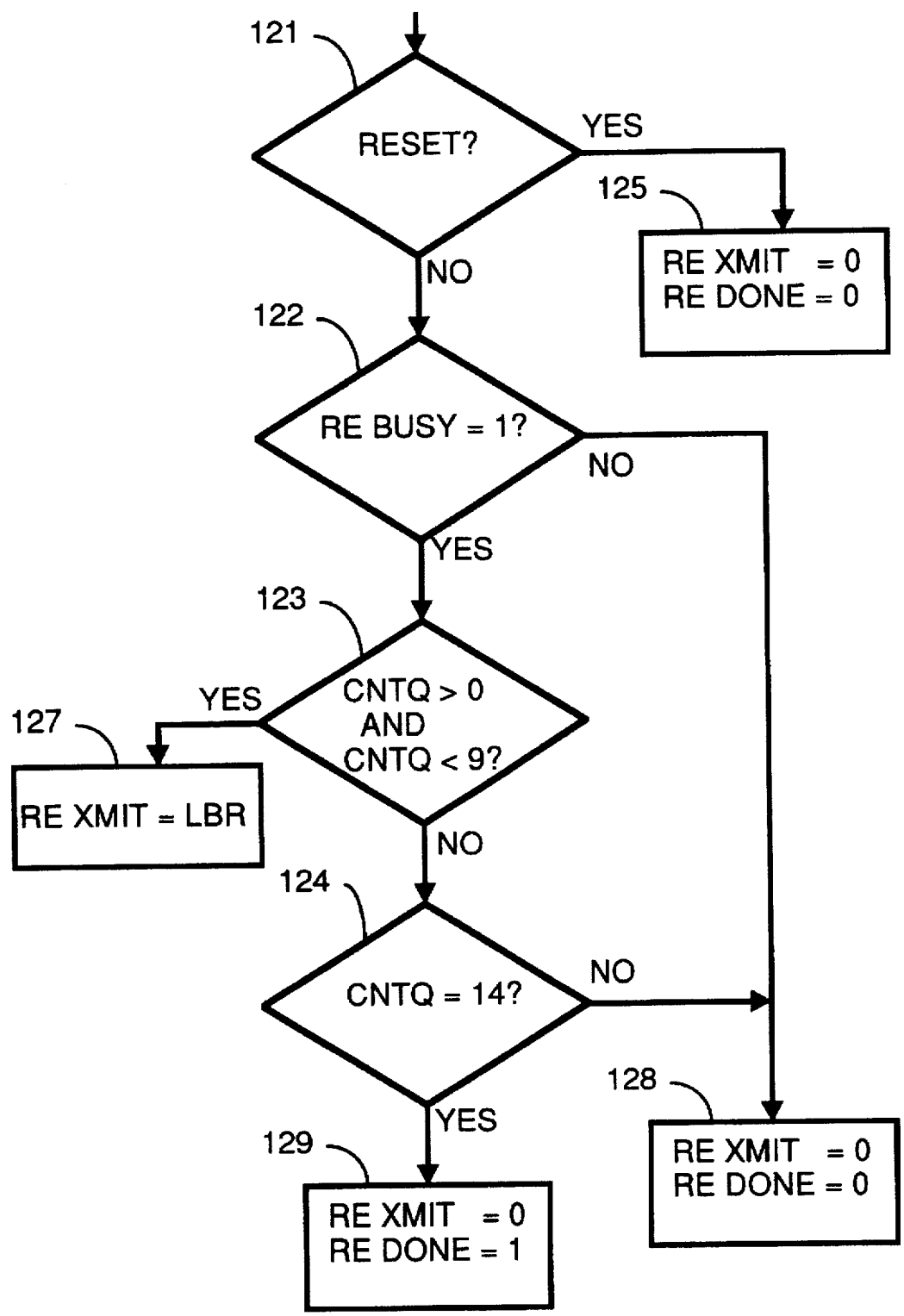
FIG. 7 shows logic flow of a state machine within encode circuitry shown in FIG. 4 in accordance with the preferred embodiment of the present invention.

FIG. 7 shows logic flow within the state machine within IR transmission circuitry 91. In a step 121, the state machine determines whether there is a reset. If so, in a step 125, the variables RE transmit and RE done are cleared to zero. If in step 121, there is no reset, in a step 122, the state machine determines whether IR transmission circuitry 91 is busy. If not, in a step 128, the variables RE transmit and RE done are cleared to zero.

If in step 122, the state machine determines IR transmission circuitry 91 is busy, in a step 123, the state machine determines whether the current count is greater than zero but less than nine. If so, in a step 127, the variable RE transmit is set to the variable LBR.

If in step 123, the state machine determines the current count is not greater than zero and less than nine, in a step 124, the state machine determines whether the count is equal to fourteen. If not, in step 128, the variables RE transmit and RE done are cleared to zero. If in step 124, the state machine determines whether the count is equal to fourteen, in a step 127, the variable RE transmit is cleared to zero and the variable RE done is set to one.

Figure 8:
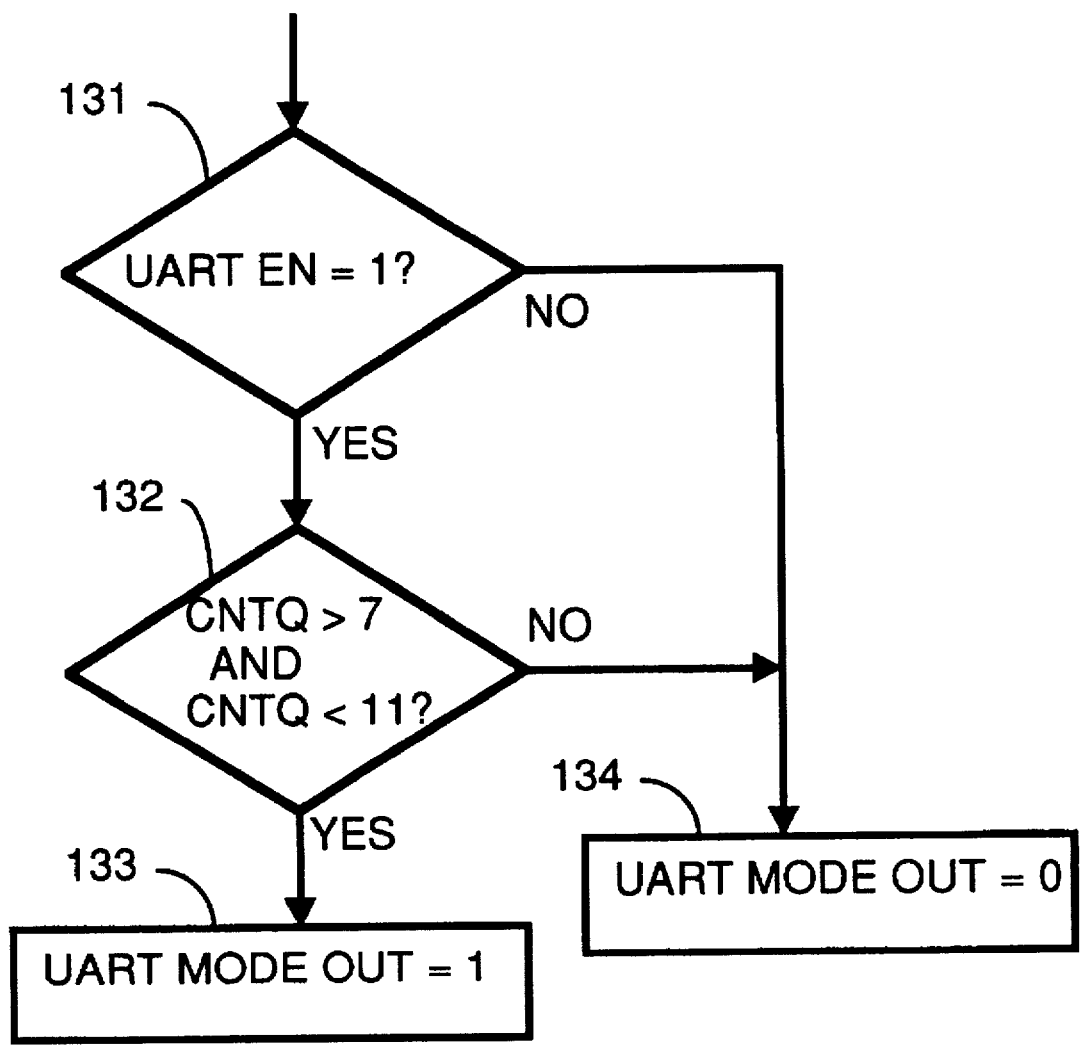
FIG. 8 shows logic flow of a state machine within encode circuitry shown in FIG. 4 in accordance with the preferred embodiment of the present invention.

FIG. 8 shows a logic flow diagram of a state machine in UART circuitry 92. In a step 131, the state machine determines whether the UART is enabled. If not, in a step 134, the variable UART mode out is cleared to zero. If in step 131, the state machine determines whether the UART is enabled, in a step 132, the state machine determines whether the current count is greater than seven but less than eleven. If not, in step 134, the variable UART mode out is cleared to zero. If in step 132, the state machine determines the current count is greater than seven but less than eleven, in a step 133, the variable UART mode out is set to one.

As discussed above, the IR/serial port interface four modes of IR transmissions. For IR transmission using a standard serial data stream transmission format, IR encode circuitry 15 converts the UART serial bit stream into a series of pulses where the presence of a pulse in a bit cell indicates a "0" and the absence of a pulse indicates a "1". IR encode circuitry 15 includes a 4-bit counter clocked and synchronously reset by a UART transmit data control signal within control signals 48. The output pulse is generated in the first three counter periods. No delay of the start of the pulse is required since the hardware is integrated with the UART in the same silicon. Sequential 0 bits allow the counter to free-run.

IR decode circuitry 16 converts the received pulse stream into a UART receive data (RXData) bit stream by stretching the received pulses to a full bit cell. Three-quarter bit cell pulses, normally recommended for hardware that is separate from the UART, is not required due to the IR hardware and the UART being integrated in the same silicon. IR decode circuitry 16 uses a 4-bit counter synchronously reset by the leading edge of each received pulse. The rising edge of the pulse sets an input flip-flop, which allows the counter to begin counting and a 0 to be output on the UART RXData. On the fifteenth count, the input flip-flop is cleared to allow the reception of another pulse. If another pulse is received before the counter reaches terminal count, the counter is synchronously reset and the UART RXData remains at 0. If the counter reach terminal count due to no incoming IR pulse, the counter stops counting and the UART RXData returns to 1. In the preferred embodiment, IR decode circuitry 16 is not disabled when transmitting, allowing reflections of the transmitted signal to be received. Software in the processor must account for the reflected signals.

Figure 9:
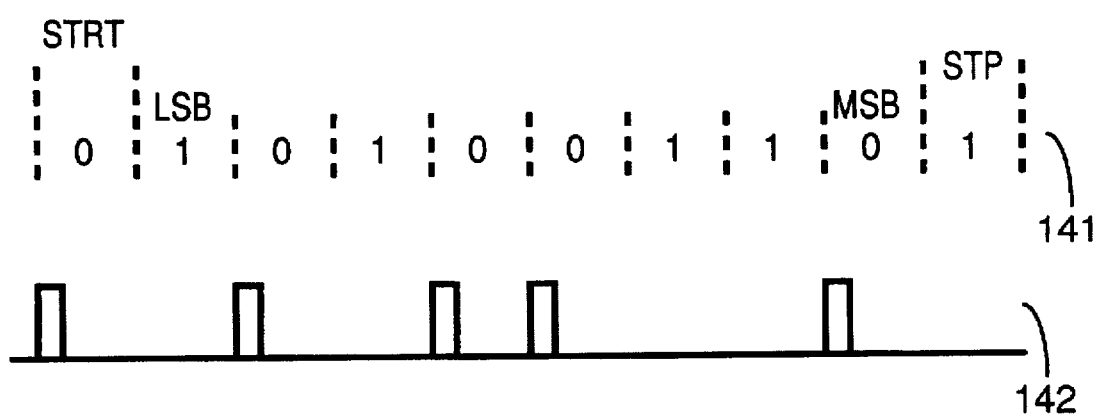
FIG. 9 shows a sample infrared frame format in accordance with the preferred embodiment of the present invention.

FIG. 9 shows a sample IR frame format 141 for eight data bits sent using a standard serial data stream transmission format. One of IR pulses 142 is sent for each bit value of "0" in IR frame format 141.

IR transmission using HP redeye transmission-only (REDEYE) format is based on a 15-bit frame, with each bit containing two half-bit cells. The pulses and all of the timing are generated from 32 kilohertz clock signal 52 with 14 cycles per half-bit cell, yielding a duration of 427 microseconds for each half-bit. The half-bit is "On" if the LED is pulsed six to eight times during the half-bit time. A one bit is encoded as two half-bits, the first one "On" and the second "Off". A zero bit is encoded as an "Off"-"On" sequence.

Figure 10:
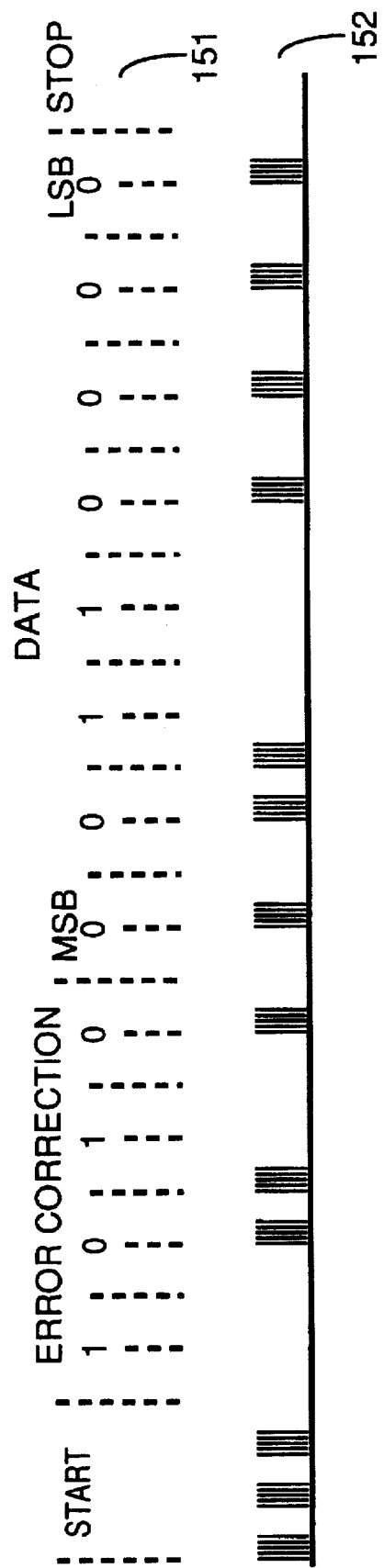
FIG. 10 shows another sample infrared frame format in accordance with the preferred embodiment of the present invention.

FIG. 10 shows a sample REDEYE frame format 151 for eight data bits. IR half bit pulses 152, as described above, are shown for REDEYE frame format 151.

To enter REDEYE Mode, a specified control (RED) bit must be set. All REDEYE frames must be generated by software in the processor. The infrared (IR)/serial port interface outputs half-bits. REDEYE transmission is initiated by a write to the LBR bit. This sets the LBF flag and starts the half-bit transmission. The bit in LBR is transferred to the formatter and the LBF bit is cleared. This indicates that it is safe to write another half-bit to the LBR. After a full half-bit transmission time, if the LBF bit is clear, the output will remain idle. Otherwise, the next half-bit will immediately be transmitted. After the LBF bit is cleared, there are 396 microseconds in which to write the next half-bit to the LBR to avoid REDEYE transmission errors.

For software-controlled, user-defined format for transmission, an LED bit in the IRCNT Register is provided. Due to LED current limitation, the duty cycle of this waveform should be limited to a time average of 29%. Software in the processor monitors IR reception receive incoming data. This is done, for example, using various bits in the IRCNT Register. The IR pulses received can be stretched by as much as 300 microseconds from the end of light transmission, an issue that software in the processor accounts for.

For modulated serial data stream transmission, the modulation source will be sent out instead of a single pulse. The modulation source is fourteen megahertz clock signal 21 divided by 29, which yields a 1.25% error from the target of 500 KHz. Due to LED current limitation, the duty cycle of this waveform is limited to a time average of 29%. To select this output mode, an IRMOD bit in the IRCTL register is set long with an IRURT bit. The UART output data is used as input to the modulator.

Figure 11:
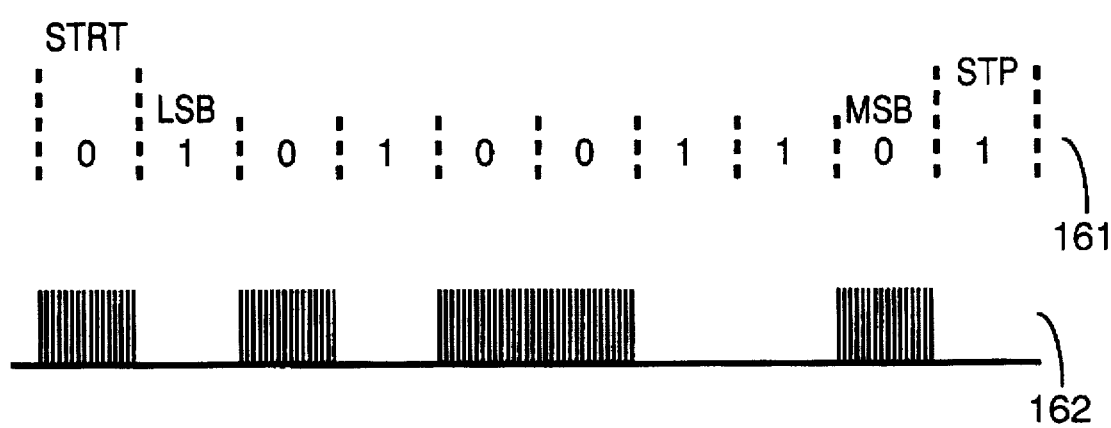
FIG. 11 shows a third sample infrared frame format in accordance with the preferred embodiment of the present invention.

FIG. 11 shows a sample modulated IR frame format 161 for eight data bits. IR modulated pulses 162 are sent for each bit value of "0" in IR frame format 161.

When modulated serial data stream transmission mode is selected, IR decode circuitry 16 normally is bypassed and the IR input is routed directly to RXData. If the DEMOD bit in the IRCTL register is set, the IR decode circuitry 16 monitors the input for any activity, i.e., rising or falling edges, within a period of the modulation clock. While activity exists, the RXData is held cleared to a zero. When no activity exists, RXData is held set to a one.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

Appendix A is hardware description language code which is a behavioral description of the preferred embodiment of the present invention.

```
--  ---------------------------------    ----------------------------------
--  file:       ir_ifc.vhd
--  purpose:    InfraRed controller for the Polar MPC
--  Version:    1.0
--  created:    2/2/93
--  released:   7/18/93
--  author:     Gregg Lahti   |  VLSI Technology, PSD
--  modified:
--  ---------------------------------    ---------------------------------- library ieee;
library vlsipsd;
library vsc4701;
library mpc_uart_work;
library mpc_550_ir_work;
use vlsipsd.types_pkg.all;
use ieee.std_logic_1164.all;
use ieee.std_logic_unsigned.all;
use vsc4701.vsc4701_components.all;

--+++++++++++++++++++++++++++++++--
        --- TOP LEVEL OF IR INTERFACE ---
        --+++++++++++++++++++++++++++++++--

--   Files used:
--          ir_xmit.vhd      (transmitter goo)
--          ir_rec.vhd       (receiver goo)
--          mc550.vhd        (standard UART mega-cell)
--
--
--   Notes:
--
--          *synopsys doesn't like bit vectors of a bus in the process
--          sensitivity list for flops or latches.  Hence, there are lots
--          of hacks in the URTCTL, SFCRA, IRCTL, IRCNT, and IRFMAT
--          register blocks
--
--          The LBR (bit to be transmitted in red-eye format) located
--          in the IRCNT register is hokey.  The hardware is assuming
--          that once the RED bit is set (in the IRFMAT register), any
--          writes to the IRCNT will initialize a transfer of the LBR
--          to the IR formatter to be transmitted.  In otherwords, when
--          a write to the IRCNT when the RED bit is set will initiate
--          an automatic transmit sequence, regardless of the LBR
--          contents.
--
--          When the ELBE is cleared, any current interrupt is cleared.
--
--          When switching irout polarity (IRPOL bit), the UART must be
--          disabled (COMENA=0) or garbage is read into the UART.
--
--          It is wise to not be transmitting or receiving with the
--          UART when BD2X is being mucked with.     :*)

entity uart_ir_ifc is
port (
-- inputs
```

*Appendix A*

Ir_ifc.vhd

```
-- Clocks
clk14m, clk32k                  : in std_logic;

-- Controls
reset, iowr_n, iord_n           : in std_logic;
bhe_n, ble_n                    : in std_logic;
clamp_com                       : in std_logic;

-- Chip selects
urtctlcs_n, irctlcs_n           : in std_logic;
sfcracs_n                       : in std_logic;
irfmatcs_n, ircntcs_n           : in std_logic;
uart550cs1_n                    : in std_logic;

-- UART signals
rxd                             : in std_logic;
cts_n, dsr_n, ri_n, dcd_n       : in std_logic;
txd, rts_n, dtr_n               : out std_logic;

-- IR signals
irin                            : in std_logic;
irout                           : out std_logic;

-- Misc
ioaddress                       : in std_logic_vector(2 downto 0);
mpc_data_in                     : in std_logic_vector(15 downto 0);
mpc_data_out                    : out std_logic_vector(15 downto 0);
irdrv                           : out std_logic_vector(1 downto 0);
ir_baddr                        : out std_logic_vector(12 downto 0);
intrpt                          : out std_logic;     -- IR/UART combined
ri_n_clamp_out                  : out std_logic;

-- Test logic interface
clkctl_ir                       : in std_logic;
testmode                        : in std_logic;
a_tst                           : in std_logic_vector(2 downto 0);
mr_tst                          : in std_logic;
rclk_tst                        : in std_logic;
cs0_tst                         : in std_logic;
cs1_tst                         : in std_logic;
cs2_n_tst                       : in std_logic;
xtalin_tst                      : in std_logic;
dostr_n_tst                     : in std_logic;
dostr_tst                       : in std_logic;
distr_n_tst                     : in std_logic;
distr_tst                       : in std_logic;
ads_n_tst                       : in std_logic;
c550_ir_test                    : in std_logic;
c550_ir_bp16                    : in std_logic;
baudout_n_tst                   : out std_logic;
ddis_tst                        : out std_logic;
txrdy_n_tst                     : out std_logic;
rxrdy_n_tst                     : out std_logic;
out1_n_tst                      : out std_logic;
out2_n_tst                      : out std_logic);

end uart_ir_ifc;

architecture uart_ir_ifc_hdl of uart_ir_ifc is
```

*ir_ifc.vhd*

```vhdl
------------------------
-- State machine types
------------------------ type sm_states_T is (reset_T, idle_T, transmit_T);

------------------
-- Component defs
------------------ component ir_xmit
port (
    mclk500k            : in  std_logic;
    clk32k              : in  std_logic;
    red                 : in  std_logic;
    irmod               : in  std_logic;
    lbr_bit             : in  std_logic;
    redeye_busy         : in  std_logic;
    reset_n             : in  std_logic;
    mod_clk             : in  std_logic;
    mod_clk_n           : in  std_logic;
    uart_sout           : in  std_logic;
    irurt               : in  std_logic;
    ir_xmit_out         : out std_logic;
    redeye_done         : out std_logic);
end component;

component ir_rec
port (
    clk_in              : in  std_logic;
    mclk1m              : in  std_logic;
    reset_n             : in  std_logic;
    irmod               : in  std_logic;
    demod               : in  std_logic;
    irurt               : in  std_logic;
    red                 : in  std_logic;
    irin_toir           : in  std_logic;
    mod_clk             : in  std_logic;
    mod_clk_n           : in  std_logic;
    ire_reset_n         : in  std_logic;
    comena              : in  std_logic;
    ir_rec_mod          : out std_logic;
    ire                 : out std_logic);
end component;

component mc550
port (
    mr                  : in  std_logic;
    ctsb                : in  std_logic;
    dsrb                : in  std_logic;
    dcdb                : in  std_logic;
    rib                 : in  std_logic;
    datai               : in  std_logic_vector(7 downto 0);
    clkinb              : in  std_logic;
    dostrb              : in  std_logic;
    distrb              : in  std_logic;
    cs2b                : in  std_logic;
    cs1                 : in  std_logic;
    cs0                 : in  std_logic;
```

Ir_Ifc.vhd

```
        dostr                   : in std_logic;
        distr                   : in std_logic;
        a0                      : in std_logic;
        a1                      : in std_logic;
        a2                      : in std_logic;
        adsb                    : in std_logic;
        rclk                    : in std_logic;
        sin                     : in std_logic;
        testmode                : in std_logic;
        out1b                   : out std_logic;
        out2b                   : out std_logic;
        rtsb                    : out std_logic;
        dtrb                    : out std_logic;
        baudoutb                : out std_logic;
        int                     : out std_logic;
        sout                    : out std_logic;
        rxrdyb                  : out std_logic;
        datao                   : out std_logic_vector(7 downto 0);
        txrdyb                  : out std_logic;
        ddis                    : out std_logic);
    end component;

-- Signal defs
----------------- signal reset_u, reset_n                     : std_logic;
signal clk, clk1, clk_n                     : std_logic;
signal mod_clk, mod_clk_n                   : std_logic;
signal baudclk, bd2x                        : std_logic;
signal bclkq                                : std_logic_vector(4 downto 0);
signal mclk500k, mclk1m                     : std_logic;
signal elbe, lbf, irurt                     : std_logic;
signal red, comena                          : std_logic;
signal iri, eiri, ire, lbr, led             : std_logic;
signal irpol, irmod, demod                  : std_logic;
signal testmode_decoded                     : std_logic;
signal uart_sout, uart_sin                  : std_logic;
signal ir_xmit_out, ir_rec_mod              : std_logic;
signal irin_toIr                            : std_logic;
signal irout_t                              : std_logic;
signal redeye_busy, redeye_start            : std_logic;
signal lbr_bit, redeye_done                 : std_logic;
signal ire_reset_n, lbf_reset_n             : std_logic;
signal intrpt_uart, intrpt_mod              : std_logic;
signal intrpt_mod1, intrpt_mod2             : std_logic;
signal intrpt_redeye                        : std_logic;
signal lbr_ld, lbf_del                      : std_logic;
signal cts_n_t, dsr_n_t, ri_n_t, dcd_n_t    : std_logic;
signal dostr_n, distr_n, dostr, distr       : std_logic;
signal cs1, cs0, cs2_n, rclk, ads_n         : std_logic;
signal out1_n, out2_n, baudout_n            : std_logic;
signal clkin, ddis                          : std_logic;
signal uart_addr                            : std_logic_vector(2 downto 0);
signal uart_data_out                        : std_logic_vector(7 downto 0);
signal urtctlq, irctlq, sfcraq              : std_logic_vector(15 downto 0);
signal irfmatq, ircntq                      : std_logic_vector(7 downto 0);
signal irfmatwrsel_n, irfmatrdsel_n         : std_logic;
signal ircntwrsel_n, ircntrdsel_n           : std_logic;
signal urtctlwrhsel_n, urtctlwrlsel_n       : std_logic;
``` ir_ifc.vhd

```
signal urtctlrdhsel_n, urt   dlsel_n      : std_logic;
signal irctlwrlsel_n                      : std_logic;
signal irctlrdhsel_n, irctlrdlsel_n       : std_logic;
signal sfcrawrsel_n                       : std_logic;
signal sfcrardlsel_n, sfcrardhsel_n       : std_logic;
signal lat_data_in                        : std_logic_vector(15 downto 0);
signal top_lat_ldl, top_lat_ld_n          : std_logic;
signal reset_ire_flp_n                    : std_logic;
signal clk14m_stoppable                   : std_logic;
signal stop_clk_t, stop_clk_n             : std_logic;
signal all_rdl_n, all_rdh_n               : std_logic;
signal t_mpc_data_out                     : std_logic_vector(15 downto 0);
signal clamp_com_n, irin_clamp            : std_logic;
signal rxd_clamp, cts_n_clamp             : std_logic;
signal dsr_n_clamp, ri_n_clamp            : std_logic;
signal dcd_n_clamp                        : std_logic;
signal clk32k_buffed                      : std_logic;

begin

-------------------------------
-- Basic relational statements
-------------------------------

IR_RESET_N: in01d5
        port map (i => reset, zn=> reset_n);
IR_CLK: ni01d5
        port map (i => clk14m, z => clk);
IR_CLK1: ni01d5
        port map (i => clk14m, z => clk1);
IR_CLK_N: in01d1
        port map (i => clk14m, zn=> clk_n);
IR_STOPCLK2: an02d2
        port map (a1 => clk14m, a2 => stop_clk_n, z => clk14m_stoppable);
IR_MODCLK: an02d2
        port map (a1 => baudout_n, a2 => comena, z => mod_clk);
IR_MODCLK_N: in01d2
        port map (i => mod_clk, zn => mod_clk_n);
IR_CLK32: ni01d3
        port map (i => clk32k, z => clk32k_buffed);

ddis_tst <= ddis;
baudout_n_tst <= baudout_n;
out1_n_tst <= out1_n;
out2_n_tst <= out2_n;
iri <= irin_toir;
ri_n_clamp_out <= ri_n_clamp;

---------------------------------------------
-- Clamping functions.  Disable inputs
-- directly from pads if clamp_com is active
-- (pad ring is powered down).
--------------------------------------------- clamp_com_n <= not clamp_com;
irin_clamp <= irin and clamp_com_n;
rxd_clamp <= rxd or clamp_com;
cts_n_clamp <= cts_n or clamp_com;
dsr_n_clamp <= dsr_n or clamp_com;
ri_n_clamp <= ri_n or clamp_com;
```

*ir_lfc.vhd*

```
dcd_n_clamp <= dcd_n or cl    _com;

-----------------------------------
-- register select generations
----------------------------------- urtctlwrhsel_n <= iowr_n or bhe_n or urtctlcs_n;
urtctlwrlsel_n <= iowr_n or ble_n or urtctlcs_n;
urtctlrdhsel_n <= iord_n or bhe_n or urtctlcs_n;
urtctlrdlsel_n <= iord_n or ble_n or urtctlcs_n;
irctlwrlsel_n <= iowr_n or ble_n or irctlcs_n;
irctlrdhsel_n <= iord_n or bhe_n or irctlcs_n;
irctlrdlsel_n <= iord_n or ble_n or irctlcs_n;
irfmatwrsel_n <= iowr_n or ble_n or irfmatcs_n;
irfmatrdsel_n <= iord_n or ble_n or irfmatcs_n;
ircntwrsel_n <= iowr_n or bhe_n or ircntcs_n;
ircntrdsel_n <= iord_n or bhe_n or ircntcs_n;

-----------------------------------------------
-- Special setup for shadow register. Writes to the
-- COMA (UART) CONTROL at address=2 or the shadow
-- register directly will enable a write.
----------------------------------------------- sfcrardlsel_n <= iord_n or ble_n or sfcracs_n;
sfcrardhsel_n <= iord_n or bhe_n or sfcracs_n;

-----------------------------------
-- Final mpc_data_out drive enable
----------------------------------- all_rdh_n <= urtctlrdhsel_n and irctlrdhsel_n and sfcrardhsel_n;
IR_ALLRDLN: an06d2
    port map (a1 => urtctlrdlsel_n, a2 => irctlrdlsel_n, a3 => irfmatrdsel_n
              a4 => ircntrdsel_n, a5 => sfcrardlsel_n, a6 => ddis, z => all_
rdl_n);

-----------------------------------
-- led bit forces irout to be on when a '1'
----------------------------------- irout_t <= ir_xmit_out or led;

-----------------------------------
-- Interrupt concatination for all modes
----------------------------------- intrpt <= intrpt_redeye or intrpt_mod or intrpt_uart;

-----------------------------------
-- top latch load select generation
----------------------------------- top_lat_ld1 <= not ((urtctlcs_n and irctlcs_n and irfmatcs_n and
               ircntcs_n and sfcrawrsel_n) or iowr_n);

IR_TOPLATLD: in01d3
    port map (i => top_lat_ld1, zn => top_lat_ld_n);

------------
```

*ir_Ifc.vhd*

```
-- Port Maps
-- ----------

IR_XMIT_PORT: ir_xmit
     port map ( clk32k         => clk32k_buffed,
                mclk500k       => mclk500k,
                reset_n        => reset_n,
                red            => red,
                irmod          => irmod,
                lbr_bit        => lbr_bit,
                redeye_busy    => redeye_busy,
                mod_clk        => mod_clk,
                mod_clk_n      => mod_clk_n,
                uart_sout      => uart_sout,
                irurt          => irurt,
                ir_xmit_out    => ir_xmit_out,
                redeye_done    => redeye_done);

IR_REC_PORT: ir_rec
     port map ( clk_in         => clk1,
                mclk1m         => mclk1m,
                reset_n        => reset_n,
                irmod          => irmod,
                demod          => demod,
                irurt          => irurt,
                red            => red,
                irin_toir      => irin_toir,
                ire_reset_n    => ire_reset_n,
                mod_clk        => mod_clk,
                mod_clk_n      => mod_clk_n,
                comena         => comena,
                ire            => ire,
                ir_rec_mod     => ir_rec_mod);

MC550_PORT: mc550
     port map ( mr             => reset_u,
                ctsb           => cts_n_t,
                dsrb           => dsr_n_t,
                dcdb           => dcd_n_t,
                rib            => ri_n_t,
                datai          => mpc_data_in(7 downto 0),
                clkinb         => clkin,
                dostrb         => dostr_n,
                distrb         => distr_n,
                cs2b           => cs2_n,
                cs1            => cs1,
                cs0            => cs0,
                dostr          => dostr,
                distr          => distr,
                a0             => uart_addr(0),
                a1             => uart_addr(1),
                a2             => uart_addr(2),
                adsb           => ads_n,
                rclk           => rclk,
                sin            => uart_sin,
                testmode       => testmode_decoded,
                out1b          => out1_n,
                out2b          => out2_n,
                rtsb           => rts_n,
                dtrb           => dtr_n,
                baudoutb       => baudout_n,
```

*Ir_Ifc.vhd*

```
            int          => intrpt_uart,
            sout         => uart_sout,
            rxrdyb       => rxrdy_n_tst,
            datao        => uart_data_out(7 downto 0),
            txrdyb       => txrdy_n_tst,
            ddis         => ddis);

-------------------------------------------------
-- Top level latch- grabs datain contents and
-- holds it until the appropriate synchronizer
-- takes over.
-------------------------------------------------

LATCH_DATA_IN: block
begin
    process (top_lat_ld_n, mpc_data_in, reset_n)
    begin
        if reset_n='0' then
            lat_data_in <= "0000000000000000";
        elsif top_lat_ld_n='0' then
            lat_data_in <= mpc_data_in;
        end if;
    end process;

end block LATCH_DATA_IN;

-------------------------------------------------
-- Flops for the clkctl_ir clock-stopping signal
-- (need to sync to the dividers input)
-------------------------------------------------

STOPCLK_SYNC: block
begin
    process (clk_n, reset_n)
    begin
        if reset_n='0' then
            stop_clk_t <= '0';
        elsif clk_n'event and clk_n='1' then
            stop_clk_t <= clkctl_Ir after 1 ns;
        end if;
    end process;

process (clk_n, reset_n)
    begin
        if reset_n='0' then
            stop_clk_n <= '1';
        elsif clk_n'event and clk_n='1' then
            stop_clk_n <= not stop_clk_t after 1 ns;
        end if;
    end process;
end block STOPCLK_SYNC;

-------------------------------------------------------------------
-- Divide the 14.318 MHz clock by 4/31 to get a 1.8475 MHz clock.
-- Reset the 5 bit counter at 31, take the output of bit 2 [bclkq(2)]
-- for normal clock speed, and bit 1 [(bclkq(1)] for 2X fast mode.
-- Note that the reset to the dividing circuit is done by the
-- S_RESET_BLK so that we can have a baudclk into the UART during
```

*Ir_Ifc.vhd*

```
-- reset. S_RESET_BLK is a 7-bit counter which gets started when
-- reset_n goes active and    ds the bclk_async_reset_n low for
-- 14 MHz clocks and then r..eases it.
-----------------------------------------------------------------

DIVIDE_BAUDCLK: block
    signal bclk_reset_n, bclk_sync_reset_n    : std_logic;
    signal bclk_reset_t_n                     : std_logic;
    signal bclk_fast, bclk_slow               : std_logic;
    signal reset_bclk                         : std_logic;
    signal bclk_async_reset_n                 : std_logic;
begin bclk_fast <= bclkq(1);
    bclk_slow <= bclkq(2);

BCLK_blk : block
        signal q_pres, q_next : std_logic_vector (bclkq'range);
        constant incVal_C : std_logic_vector(4 downto 0) := "00001";
    begin
        bclkq <= q_pres;   -- update REAL counter output new_count : process (q_pres, bclk_sync_reset_n)
            VARIABLE q_next_var : std_logic_vector (bclkq'range);
        begin
            if bclk_sync_reset_n='0' then
                q_next_var := "00000";
            else
                q_next_var := (q_pres) + (incVal_C);
            end if;
            q_next <= q_next_var;
        end process new_count;

bclk_reg_count : process (bclk_async_reset_n, clk14m_stoppable)
        begin
            if bclk_async_reset_n = '0' then
                q_pres <= "00000";
            elsif clk14m_stoppable'event and clk14m_stoppable = '1' then
                q_pres <= q_next after 1 ns;
            end if;
        end process bclk_reg_count;

SYNC_RES_COMPARE:
        process (bclkq)
        begin
            if bclkq="11110" then
                bclk_sync_reset_n <= '0';
            else
                bclk_sync_reset_n <= '1';
            end if;
        end process;

end block BCLK_blk;

S_RESET_BLK : block
        signal sq_pres, sq_next    : std_logic_vector(1 downto 0);
        signal sync_bclkq          : std_logic_vector(1 downto 0);
        constant s_incVal_C        : std_logic_vector(1 downto 0) := "01";
        signal bclk_sync_hold      : std_logic;
```

*ir_lfc.vhd*

```vhdl
begin
    sync_bclkq <= sq_pres;  -- update REAL counter output
    reset_bclk <= not reset_n;
    bclk_async_reset_n <= not (sync_bclkq(1) xor sync_bclkq(0));

S_COMB_COUNT:
    process (sq_pres, bclk_sync_hold)
        VARIABLE sq_next_var : std_logic_vector (1 downto 0);
    begin
        if bclk_sync_hold='1' then
            sq_next_var := sq_pres;
        else
            sq_next_var := (sq_pres) + (s_incVal_C);
        end if;
        sq_next <= sq_next_var;
    end process;

S_BCLK_REG_COUNT:
    process (reset_bclk, clk14m_stoppable)
    begin
        if reset_bclk = '0' then
            sq_pres <= "00";
        elsif clk14m_stoppable'event and clk14m_stoppable = '1' then
            sq_pres <= sq_next after 1 ns;
        end if;
    end process;

S_BCLK_COMB:
    process (sync_bclkq)
    begin
        if sync_bclkq="11" then
            bclk_sync_hold <= '1';
        else
            bclk_sync_hold <= '0';
        end if;
    end process S_BCLK_COMB;

end block S_RESET_BLK;

------------------------------------------------
-- Determine baudclk Freqency from BD2X setting
------------------------------------------------ process (bd2x, bclk_fast, bclk_slow)
begin
    if bd2x='1' then
        baudclk <= bclk_fast;
    else
        baudclk <= bclk_slow;
    end if;
end process;

end block DIVIDE_BAUDCLK;

DIVIDE_500K: block
    signal d500clkq            : std_logic_vector(4 downto 0);
begin
```

*ir_ifc.vhd*

```vhdl
        mclk500k <= d500clkq(4);
        mclkim <= d500clkq(3);

D500_CLK_blk : block
            signal q_pres, q_next : std_logic_vector (d500clkq'range);
            constant incVal_C : std_logic_vector(4 downto 0) := "00001";
        begin
            d500clkq <= q_pres;    -- update REAL counter output div_new_count : process (q_pres)
                variable q_next_var : std_logic_vector (d500clkq'range);
            begin
                if q_pres = "11101" then
                    q_next_var := "00000";
                else
                    q_next_var := (q_pres) + (incVal_C);
                end if;
                q_next <= q_next_var;
            end process div_new_count;

div_reg_count : process (reset_n, clk14m_stoppable)
            begin
                if reset_n = '0' then
                    q_pres <= "00000";
                elsif clk14m_stoppable'event and clk14m_stoppable ='1' then
                    q_pres <= q_next after 1 ns;
                end if;
            end process div_reg_count;
        end block D500_CLK_blk;

end block DIVIDE_500K;

------------------------------------
    -- Control test mode and IR/UART pins
    ------------------------------------

TEST_BLOCK: block
    begin

------------------------------------
        -- Process to mux test signals or real signals
        ------------------------------------

TEST_MODE_DECODED:
        process (c550_ir_test, mr_tst, a_tst, ade_n_tst, cs0_tst, cs1_tst,
                 cs2_n_tst, dostr_n_tst, distr_n_tst, dostr_tst, distr_tst,
                 xtalin_tst, rclk_tst, reset, ioaddress, uart550csl_n, iowr_n,
                 iord_n, baudclk, baudout_n, c550_ir_bp16, testmode)
        begin
            if c550_ir_test='1' then
                uart_addr <= a_tst;
                ade_n <= ade_n_tst;
                cs0 <= cs0_tst;
                cs1 <= cs1_tst;
                cs2_n <= cs2_n_tst;
                dostr_n <= dostr_n_tst;
                distr_n <= distr_n_tst;
                dostr <= dostr_tst;
                distr <= distr_tst;
``` ir_ifc.vhd

```vhdl
                clkin <= xtalin_st;
                rclk <= rclk_t
                reset_u <= mr_t__;
                testmode_decoded <= testmode;
            else
                uart_addr <= ioaddress;
                ads_n <= '0';
                cs0 <= '1';
                cs1 <= '1';
                cs2_n <= uart550csl_n;
                distr_n <= iord_n;
                distr <= '0';
                dostr_n <= iowr_n;
                dostr <= '0';
                clkin <= baudclk;
                rclk <= baudout_n;
                testmode_decoded <= c550_ir_bp16;
                reset_u <= reset;
            end if;
        end process;

end block TEST_BLOCK;

--------------------------------
    -- Register control blocks
    --------------------------------

URTCTL_REG: block signal urtctl_l_load          : std_logic;
        signal urtctl_h_load          : std_logic;
        signal load_reset_l_n         : std_logic;
        signal load_al, sync_bl       : std_logic;
        signal load_reset_h_n         : std_logic;
        signal load_ah, sync_bh       : std_logic;
        signal clear_l_n, clear_h_n   : std_logic;
        signal mpc_data_hack_h        : std_logic_vector(7 downto 0);
        signal mpc_data_hack_lu       : std_logic_vector(4 downto 0);
        signal mpc_data_hack_l1       : std_logic;
        signal mpc_data_hack_l0       : std_logic;
        signal hack_urtctlq_h         : std_logic_vector(7 downto 0);
        signal hack_urtctlq_l         : std_logic_vector(4 downto 0);
        signal urtctlq_1              : std_logic;
        signal urtctlq_0              : std_logic;

begin

-- Hack for synopsys bug, can't do vectors in process sense list
        -- or bus vectors in a FLOP/LATCH situation. Gotta make signals
        -- and hack it up.
        mpc_data_hack_h  <= lat_data_in(15 downto 8);
        mpc_data_hack_lu <= lat_data_in(7 downto 3);
        mpc_data_hack_l1 <= lat_data_in(1);
        mpc_data_hack_l0 <= lat_data_in(0);
        urtctlq(15 downto 8) <= hack_urtctlq_h;
        urtctlq(7 downto 3)  <= hack_urtctlq_l;
        urtctlq(1) <= urtctlq_1;
        urtctlq(0) <= urtctlq_0;

load_reset_l_n <= reset_n and clear_l_n;
``` lr_lfc.vhd

```
load_reset_h_n <= reset   and clear_h_n;

urtctlq(2) <= '0';
ir_baddr <= urtctlq(15 downto 3);
comena <= urtctlq(0);
bd2x <= urtctlq(1);

URT_LAT_H:
process (reset_n, urtctl_h_load, mpc_data_hack_h)
begin
    if reset_n='0' then
        hack_urtctlq_h <= "00000011";
    elsif urtctl_h_load='1' then
        hack_urtctlq_h <= mpc_data_hack_h after 1 ns;
    end if;
end process;

URT_LAT_L:
process (reset_n, urtctl_l_load, mpc_data_hack_lu)
begin
    if reset_n='0' then
        hack_urtctlq_l <= "11111";
    elsif urtctl_l_load='1' then
        hack_urtctlq_l <= mpc_data_hack_lu after 1 ns;
    end if;
end process;

URT_FLP_1_OL:
process (clk1, reset_n, urtctl_l_load)
begin
    if reset_n='0' then
        urtctlq_1 <= '0';
        urtctlq_0 <= '1';
    elsif clk1'event and clk1='1' then
        if urtctl_l_load='1' then
            urtctlq_1 <= mpc_data_hack_11 after 1 ns;
            urtctlq_0 <= mpc_data_hack_10 after 1 ns;
        end if;
    end if;
end process;

URT_8A_L:
process (urtctlwrlsel_n, load_reset_l_n)
begin
    if load_reset_l_n='0' then
        load_al <= '0';
    elsif urtctlwrlsel_n'event and urtctlwrlsel_n='1' then
        load_al <= '1' after 1 ns;
    end if;
end process;

URT_8B_L:
process (clk1, load_al, load_reset_l_n)
begin
    if load_reset_l_n='0' then
        sync_bl <= '0';
    elsif clk1='1' then
        sync_bl <= load_al after 1 ns;
    end if;
end process;
``` ir_ifc.vhd

```
    clear_l_n <= not urtctl_load;

URT_LD_L:
process (clk1, reset_n)
begin
    if reset_n='0' then
        urtctl_l_load <= '0';
    elsif clk1'event and clk1='1' then
        urtctl_l_load <= sync_bl after 1 ns;
    end if;
end process;

URT_SA_H:
process (urtctlwrhsel_n, load_reset_h_n)
begin
    if load_reset_h_n='0' then
        load_ah <= '0';
    elsif urtctlwrhsel_n'event and urtctlwrhsel_n='1' then
        load_ah <= '1' after 1 ns;
    end if;
end process;

URT_SB_H:
process (clk1, load_ah, load_reset_h_n)
begin
    if load_reset_h_n='0' then
        sync_bh <= '0';
    elsif clk1='1' then
        sync_bh <= load_ah;
    end if;
end process;

clear_h_n <= not urtctl_h_load;

URT_LD_H:
process (clk1, reset_n)
begin
    if reset_n='0' then
        urtctl_h_load <= '0';
    elsif clk1'event and clk1='1' then
        urtctl_h_load <= sync_bh after 1 ns;
    end if;
end process;

------------------------------------------------------------
-- Direct UART I/O to either IR interface or serial drivers.
------------------------------------------------------------ process (comena, irout_t, rxd_clamp, irin_clamp, uart_sout, ir_rec_mod,
         irpol, cts_n_clamp, dsr_n_clamp, ri_n_clamp, dcd_n_clamp)
begin
    if comena='1' then           -- enable IR, disable UART
        irout <= irout_t xor irpol;  -- polarity
        uart_sin <= ir_rec_mod;
        irin_toir <= irin_clamp;
        txd <= '1';              -- idle 1's being output
        cts_n_t <= '0';          -- Modem Status Register
        dsr_n_t <= '0';          -- will read 0x30.
        ri_n_t <= '1';
        dcd_n_t <= '1';
```

ir_ifc.vhd

```vhdl
        else
            txd <= uart_sou                  -- enable UART, disable
            uart_sin <= rxd_clamp;
            irin_toir <= '0';                -- nothing into IR section
            irout <= '0' xor irpol;          -- polarity
            cts_n_t <= cts_n_clamp;
            dsr_n_t <= dsr_n_clamp;
            ri_n_t <= ri_n_clamp;
            dcd_n_t <= dcd_n_clamp;
        end if;
    end process;

end block URTCTL_REG;

--------------------------------
-- Guts for the IRCTL register
--------------------------------

IRCTL_REG: block
    signal irctl_load           : std_logic;
    signal load_reset_n         : std_logic;
    signal load_a, sync_b       : std_logic;
    signal clear_n              : std_logic;
    signal mpc_data_hack        : std_logic_vector(4 downto 0);
    signal hack_irctlq          : std_logic_vector(4 downto 0);
begin -- Hack for synopsys bug, can't do vectors in process sense list
    -- or bus vectors in a FLOP/LATCH situation. Gotta make signals
    -- and hack it up.
    mpc_data_hack <= lat_data_in(5 downto 1);

load_reset_n <= reset_n and clear_n;

irctlq(15 downto 6) <= "0000000000";
    irctlq(5 downto 1) <= hack_irctlq;
    irctlq(0) <= '0';
    irpol <= irctlq(5);
    irdrv <= irctlq(4 downto 3);
    irmod <= irctlq(2);
    demod <= irctlq(1);

IRCTL_LAT5_1:
    process (reset_n, irctl_load, mpc_data_hack)
    begin
        if reset_n='0' then
            hack_irctlq <= "00000";
        elsif irctl_load='1' then
            hack_irctlq <= mpc_data_hack after 1 ns;
        end if;
    end process;

IRT_SA:
    process (irctlwrlsel_n, load_reset_n)
    begin
        if load_reset_n='0' then
            load_a <= '0';
        elsif irctlwrlsel_n'event and irctlwrlsel_n='1' then
            load_a <= '1' after 1 ns;
        end if;
```

*Ir_ltc.vhd*

```vhdl
    end process;

IRT_SB:
process (clk1, load_a, load_reset_n)
begin
    if load_reset_n='0' then
        sync_b <= '0';
    elsif clk1='1' then
        sync_b <= load_a after 1 ns;
    end if;
end process;

clear_n <= not irctl_load;

IRT_LD:
process (clk1, reset_n)
begin
    if reset_n='0' then
        irctl_load <= '0';
    elsif clk1'event and clk1='1' then
        irctl_load <= sync_b after 1 ns;
    end if;
end process;

end block IRCTL_REG;

-------------------------------------------
-- Guts for the SFCRA shadow register.
-- Contents gets updated on writes to
-- UART (addr=0x2).
-------------------------------------------

SFCRA_REG: block
    signal mpc_data_hack_u    : std_logic_vector(1 downto 0);
    signal mpc_data_hack_l    : std_logic_vector(3 downto 0);
    signal hack_sfcraq_h      : std_logic_vector(1 downto 0);
    signal hack_sfcraq_l      : std_logic_vector(3 downto 0);
begin -- Hack for synopsys bug, can't do vectors in process sense list
    -- or bus vectors in a FLOP/LATCH situation.  Gotta make signals
    -- and hack it up.
    mpc_data_hack_u <= lat_data_in(7 downto 6);
    mpc_data_hack_l <= lat_data_in(3 downto 0);

sfcraq(15 downto 8) <= "00000000";
    sfcraq(7 downto 6)  <= hack_sfcraq_h;
    sfcraq(5 downto 4)  <= "00";
    sfcraq(3 downto 0)  <= hack_sfcraq_l;

-------------------------------------------
    -- Process to get a chip select for the
    -- shadow register when writing
    -------------------------------------------

SHADOW_SEL:
    process (ioaddress, uart550csl_n, iowr_n, ble_n)
    begin
        if ioaddress="010" and uart550csl_n='0' and ble_n='0'
```

*ir_ifc.vhd*

```vhdl
            and iowr_n='0' the
                sfcrawrsel_n <=    ';
            else
                sfcrawrsel_n <= '1';
            end if;
      end process;

SFCRA_LAT:
    process (reset_n, sfcrawrsel_n, mpc_data_hack_u, mpc_data_hack_l)
    begin
        if reset_n='0' then
            hack_sfcraq_h <= "00";
            hack_sfcraq_l <= "0000";
        elsif sfcrawrsel_n='0' then
            hack_sfcraq_h <= mpc_data_hack_u after 1 ns;
            hack_sfcraq_l <= mpc_data_hack_l after 1 ns;
        end if;
    end process;

end block SFCRA_REG;

-----------------
-- IR Guts.
-----------------

IR_BLOCK: block
    signal irfmat_load, ircnt_load    : std_logic;
    signal fifo_reset_n               : std_logic;
    signal redeye_d_e_n               : std_logic;
    signal re_intrpt_clear_n          : std_logic;
    signal ircnt_load_n               : std_logic;
    signal ircntwr_pulse_del          : std_logic;
    signal ircntwr_pulse_del_n        : std_logic;
    signal ircntwr_pulse_dell         : std_logic;
begin IRFMAT_REG: block
        signal load_reset_n           : std_logic;
        signal load_a, sync_b         : std_logic;
        signal clear_n                : std_logic;
        signal mpc_data_hack_6        : std_logic;
        signal mpc_data_hack_2        : std_logic;
        signal mpc_data_hack_0        : std_logic;
        signal lbf_load_en            : std_logic;
        signal irfmatq_6              : std_logic;
        signal irfmatq_2              : std_logic;
        signal irfmatq_0              : std_logic;
    begin -- Hack for synopsys bug, can't do vectors in process sense list
        -- or bus vectors in a FLOP/LATCH situation. Gotta make signals
        -- and hack it up.
        mpc_data_hack_6 <= lat_data_in(6);
        mpc_data_hack_2 <= lat_data_in(2);
        mpc_data_hack_0 <= lat_data_in(0);

load_reset_n <= reset_n and clear_n;

irfmatq(7) <= '0';              -- Reserved bits
``` ir_ifc.vhd

```
irfmatq(4 downto 3)   <= "00";
irfmatq(1) <= '0';
irfmatq(6) <= irfmatq_6;
irfmatq(2) <= irfmatq_2;
irfmatq(0) <= irfmatq_0;

elbe <= irfmatq(6);
irfmatq(5) <= lbf;   -- read only bit, mirrors lbr bit.
irurt <= irfmatq(2);
red <= irfmatq(0);

IRFMAT_FLOP:
process (clk1, reset_n, irfmat_load)
begin
    if reset_n='0' then
        irfmatq_6 <= '0';
        irfmatq_2 <= '0';
        irfmatq_0 <= '0';
    elsif clk1'event and clk1='1' then
        if irfmat_load='1' then
            irfmatq_6 <= mpc_data_hack_6 after 1 ns;
            irfmatq_2 <= mpc_data_hack_2 after 1 ns;
            irfmatq_0 <= mpc_data_hack_0 after 1 ns;
        end if;
    end if;
end process;

IRFMAT_SA:
process (irfmatwrsel_n, load_reset_n)
begin
    if load_reset_n='0' then
        load_a <= '0';
    elsif irfmatwrsel_n'event and irfmatwrsel_n='1' then
        load_a <= '1' after 1 ns;
    end if;
end process;

IRFMAT_SB:
process (clk1, load_a, load_reset_n)
begin
    if load_reset_n='0' then
        sync_b <= '0';
    elsif clk1='1' then
        sync_b <= load_a after 1 ns;
    end if;
end process;

clear_n <= not irfmat_load;

IRFMAT_LD:
process (clk1, reset_n)
begin
    if reset_n='0' then
        irfmat_load <= '0';
    elsif clk1'event and clk1='1' then
        irfmat_load <= sync_b after 1 ns;
    end if;
end process;
```

*ir_lfc.vhd*

```
-- LBF bit sticky flop
------------------------- lbf_load_en <= ircnt_load and red;

LBF_STICKY_BIT:
    process (clk1, reset_n, lbf_reset_n, lbf_load_en)
    begin
        if reset_n='0' or lbf_reset_n='0' then
            lbf <= '0';
        elsif clk1'event and clk1='1' then
            if lbf_load_en='1' then
                lbf <= '1' after 1 ns;
            end if;
        end if;
    end process;

LBF_DEL_PROC:
    process (clk1, reset_n, lbf_reset_n)
    begin
        if reset_n='0' or lbf_reset_n='0' then
            lbf_del <= '0';
        elsif clk1'event and clk1='1' then
            lbf_del <= lbf;
        end if;
    end process;

end block IRFMAT_REG;

-------------------------
-- IRCNT register guts
-------------------------

IRCNT_REG: block
    signal load_reset_n       : std_logic;
    signal load_a, sync_b     : std_logic;
    signal intrpt_reset_n     : std_logic;
    signal iri_n              : std_logic;
    signal mpc_data_hack_6    : std_logic;
    signal mpc_data_hack_5    : std_logic;
    signal mpc_data_hack_1    : std_logic;
    signal mpc_data_hack_0    : std_logic;
    signal ircntq_7           : std_logic;
    signal ircntq_6           : std_logic;
    signal ircntq_5           : std_logic;
    signal ircntq_1           : std_logic;
    signal ircntq_0           : std_logic;
begin
    -- Hack for synopsys bug, can't do vectors in process sense list
    -- or bus vectors in a FLOP/LATCH situation. Gotta make signals
    -- and hack it up.
    mpc_data_hack_6 <= lat_data_in(6);
    mpc_data_hack_5 <= lat_data_in(5);
    mpc_data_hack_1 <= lat_data_in(1);
    mpc_data_hack_0 <= lat_data_in(0);
    ircntq(7) <= ircntq_7;
    ircntq(6) <= ircntq_6;
```

*Ir_Ifc.vhd*

```vhdl
ircntq(5) <= ircntr_;
ircntq(4 downto 2)     "000";        -- Reserved bits
ircntq(1) <= ircntq_1;
ircntq(0) <= ircntq_0;

-- operational bits
eiri <= ircntq(6);
led  <= ircntq(0);
lbr  <= ircntq(1);

-----------------------------------------
-- Synchronization flops for the write
----------------------------------------- load_reset_n <= ircnt_load_n and reset_n;

IRCNT_SA:
process (ircntwrsel_n, load_reset_n)
begin
    if load_reset_n='0' then
        load_a <= '0';
    elsif ircntwrsel_n'event and ircntwrsel_n='1' then
        load_a <= '1' after 1 ns;
    end if;
end process;

IRCNT_SB:
process (clk, load_a, load_reset_n)
begin
    if load_reset_n='0' then
        sync_b <= '0';
    elsif clk='1' then
        sync_b <= load_a after 1 ns;
    end if;
end process;

ircnt_load_n <= not ircnt_load;

IRCNT_LD:
process (clk, reset_n)
begin
    if reset_n='0' then
        ircnt_load <= '0';
    elsif clk'event and clk='1' then
        ircnt_load <= sync_b after 1 ns;
    end if;
end process;

IRCNT_FLOP:
process (clk, reset_n, ircnt_load)
begin
    if reset_n='0' then
        ircntq_0 <= '0';
        ircntq_1 <= '0';
        ircntq_6 <= '0';
    elsif clk'event and clk='1' then
        if ircnt_load='1' then
            ircntq_0 <= mpc_data_hack_0 after 1 ns;
            ircntq_1 <= mpc_data_hack_1 after 1 ns;
            ircntq_6 <= mpc_data_hack_6 after 1 ns;
```

*Ir_Ifc.vhd*

```
        end if;
    end if;
end process;

-------------------------------
-- IRE bit process
-- When writing to the IRE
-- location, it resets the IRE
-- bit.  (Weird, eh?)
------------------------------- reset_ire_flp_n <= reset_n and ircntwr_pulse_del_n;

IRE_FLOP:
process (clk, ircnt_load, reset_ire_flp_n)
begin
    if reset_ire_flp_n='0' then
        ire_reset_n <= '1';
    elsif clk'event and clk='1' then
        if ircnt_load='1' then
            ire_reset_n <= not mpc_data_hack_5 after 1 ns;
        end if;
    end if;
end process;

-------------------------------------------
-- Generate a 2-clock delayed pulse from
-- the load of IRCNT register
-- Use this for redeye state machine and
-- redeye interrupt routine.
-------------------------------------------

IRCNTWR_DEL1:
process (clk, reset_n)
begin
    if reset_n='0' then
        ircntwr_pulse_del1 <= '0';
    elsif clk'event and clk='1' then
        ircntwr_pulse_del1 <= ircnt_load after 1 ns;
    end if;
end process;

ircntwr_pulse_del_n <= not ircntwr_pulse_del;

IRCNTWR_DEL2:
process (clk, reset_n)
begin
    if reset_n='0' then
        ircntwr_pulse_del <= '0';
    elsif clk'event and clk='1' then
        ircntwr_pulse_del <= ircntwr_pulse_del1 after 1 ns;
    end if;
end process;

-----------------------------------
-- IRI and IRE signal latch.  Snag
-- value when being read.
-----------------------------------
```

*ir_lfc.vhd*

```vhdl
    process (ircntrdsel_n, reset_n, iri, ire)
    begin
        if reset_n='0' then
            ircntq_5 <= '0';
            ircntq_7 <= '0';
        elsif ircntrdsel_n='1' then
            ircntq_5 <= ire after 1 ns;
            ircntq_7 <= iri after 1 ns;
        end if;
    end process;

------------------------------------------
    -- Interrupt (async) from IRI changes.
    -- Enabled by the EIRI bit.
    -- Currently, reading ircnt clears
    -- the interrupt.
    ------------------------------------------ intrpt_mod <= intrpt_mod1 or intrpt_mod2;
    intrpt_reset_n <= ircntrdsel_n and reset_n and eiri;
    iri_n <= not iri;

process (iri, intrpt_reset_n, ircntrdsel_n)
    begin
        if intrpt_reset_n='0' then
            intrpt_mod2 <= '0' after 1 ns;
        elsif iri'event and iri='1' then
            intrpt_mod2 <= '1' after 1 ns;
        end if;
    end process;

process (iri_n, intrpt_reset_n, ircntrdsel_n)
    begin
        if intrpt_reset_n='0' then
            intrpt_mod1 <= '0' after 1 ns;
        elsif iri_n'event and iri_n='1' then
            intrpt_mod1 <= '1' after 1 ns;
        end if;
    end process;

end block IRCNT_REG;

------------------------------------------------------
-- LBR block.  When writing to the ircnt reg and
-- redeye mode is active, the lbr_write signal is
-- active 1 cycle after the ircnt write is completed.
-- a 1-bit fifo logic is encoded with the RED_SM
-- state machine.
------------------------------------------------------

LBR_AND_FIFO: block
    signal next_state_T, pres_state_T   : sm_states_T;
    signal t_lbf_reset_n                : std_logic;
begin ------------------------------------------------
    -- State Machine for lbr and lbf (1 deep fifo).
```

Ir_Ifc.vhd

```
-- Will reset lbf b'  after sending the bit to
-- transmitter and    load lbr if fifo bit is set.
-------------------   ------------------------------

RED_SM:
process (reset_n, redeye_busy, lbf_del, red, pres_state_T)
    variable next_state_v       : sm_states_T;
    variable lbr_ld_v           : std_logic;
    variable redeye_start_v     : std_logic;
    variable lbf_reset_n_v      : std_logic;

begin
    -- Defaults
    lbr_ld_v := '0';
    redeye_start_v := '0';
    lbf_reset_n_v := '1';
    next_state_v := pres_state_T;

case pres_state_T is when reset_T =>
            redeye_start_v := '0';
            lbr_ld_v := '0';
            lbf_reset_n_v := '1';
            next_state_v := idle_T;

when idle_T =>
            if red='1' and lbf_del='1' then
                lbr_ld_v := '1';
                redeye_start_v := '1';
                lbf_reset_n_v := '0';
                next_state_v := transmit_T;
            else
                next_state_v := idle_T;
            end if;

when transmit_T =>
            if redeye_busy='1' then
                next_state_v := transmit_T;
            else
                next_state_v := idle_T;
            end if;

end case;

-- assign outputs
    redeye_start <= redeye_start_v;
    lbr_ld <= lbr_ld_v;
    t_lbf_reset_n <= lbf_reset_n_v;
    next_state_T <= next_state_v;
end process;

-------------------------------
-- state registers for RED_SM
-- state machine
-------------------------------

STATE_REG_T:
process (reset_n, clk)
begin
```

Ir_Ifc.vhd

```
            if reset_n='0' then
                pres_state_  = reset_T;
            elsif clk'event and clk='1' then
                pres_state_T <= next_state_T after 1 ns;
            end if;
        end process;

FLOP_LBF_RESETN:
        process (clk, reset_n)
        begin
            if reset_n='0' then
                lbf_reset_n <= '1';
            elsif clk'event and clk='1' then
                lbf_reset_n <= t_lbf_reset_n after 1 ns;
            end if;
        end process;

end block LBR_AND_FIFO;

-------------------------------
    -- Generate pulse when redeye
    -- transfer is completed
    -------------------------------

SYNC_DONE: block
        signal t1, t2, ta          : std_logic;
        signal sync_re_done        : std_logic;
    begin fifo_reset_n <= redeye_d_s_n and reset_n;
        redeye_d_s_n <= not (t1 and t2);

SYNC_LAT:
        process (clk, redeye_done, reset_n)
        begin
            if reset_n='0' then
                sync_re_done <= '0';
            elsif clk='1' then
                sync_re_done <= redeye_done after 1 ns;
            end if;
        end process;

SYNC_FLOP:
        process (clk, reset_n)
        begin
            if reset_n='0' then
                ta <= '0';
            elsif clk'event and clk='1' then
                ta <= sync_re_done after 1 ns;
            end if;
        end process;

SPEW_1:
        process (clk, reset_n)
        begin
            if reset_n='0' then
                t1 <= '1';
            elsif clk'event and clk='1' then
                t1 <= ta after 1 ns;
            end if;
```

*ir_ifc.vhd*

```
    end process;

SPEW_2:
    process (clk, reset_n)
    begin
        if reset_n='0' then
            t2 <= '0';
        elsif clk'event and clk='1' then
            t2 <= not t1 after 1 ns;
        end if;
    end process;
end block SYNC_DONE;

------------
-- Fifo flop
------------

FIFO_PROC:
process (clk, fifo_reset_n, redeye_start)
begin
    if fifo_reset_n='0' then
        redeye_busy <= '0';
    elsif clk'event and clk='1' then
        if redeye_start='1' then
            redeye_busy <= '1' after 1 ns;
        end if;
    end if;
end process;

---------------------------
-- latch for loading LBR bit
--------------------------- process (reset_n, lbr_ld, lbr)

begin
    if reset_n='0' then
        lbr_bit <= '0' after 1 ns;
    elsif lbr_ld='1' then
        lbr_bit <= lbr after 1 ns;
    end if;
end process;

-------------------------------------------------
-- Redeye Interrupt handling.  Interrupt occurs
-- when lbr is transferred to redye xmitter and
-- elbe=1.  Gets cleared when ircnt reg is written
-- to, master reset_n is active, or elbe=0.
------------------------------------------------- re_intrpt_clear_n <= reset_n and elbe and ircnt_load_n;

process (redeye_start, re_intrpt_clear_n)
begin
    if re_intrpt_clear_n='0' then
        intrpt_redeye <= '0' after 1 ns;
    elsif redeye_start'event and redeye_start='1' then
        intrpt_redeye <= '1' after 1 ns;
```

*lr_lfc.vhd*

```
        end if;
    end process;

end block IR_BLOCK;

----------------------------------------
-- cheezy MUX the output of control registers
-- and uart_data_out to mpc_data_out
---------------------------------------- t_mpc_data_out(7 downto 0) <= uart_data_out when ddis='0' else "ZZZZZZZZ";
    t_mpc_data_out(7 downto 0) <= urtctlq(7 downto 0) when urtctlrdlsel_n='0' el
se "ZZZZZZZZ";
    t_mpc_data_out(7 downto 0) <= ircntq when ircntrdsel_n='0' else "ZZZZZZZZ";
    t_mpc_data_out(7 downto 0) <= sfcraq(7 downto 0) when sfcrardlsel_n='0' else
"ZZZZZZZZ";
    t_mpc_data_out(7 downto 0) <= irfmatq when irfmatrdsel_n='0' else "ZZZZZZZZ"
;
    t_mpc_data_out(7 downto 0) <= irctlq(7 downto 0) when irctlrdlsel_n='0' else
"ZZZZZZZZ";
    t_mpc_data_out(15 downto 8) <= urtctlq(15 downto 8) when urtctlrdhsel_n='0'
else "ZZZZZZZZ";
    t_mpc_data_out(15 downto 8) <= irctlq(15 downto 8) when irctlrdhsel_n='0' el
se "ZZZZZZZZ";
    t_mpc_data_out(15 downto 8) <= sfcraq(15 downto 8) when sfcrardhsel_n='0' el
se "ZZZZZZZZ";

----------------------------------------
-- Bus repeaters.  Don't want tristate
-- condition hanging around
----------------------------------------

GEN_REP:
for i in 15 downto 0 generate
    IRREP: rp01d1 port map (z => t_mpc_data_out(i));
end generate;

----------------------------------------
-- Output drivers.  Want 5X drivers
----------------------------------------

GEN_DATH:
for i in 15 downto 8 generate
    DIRBUFH: nt02d5
        port map ( i => t_mpc_data_out(i), oen => all_rdh_n, z => mpc_data_out(i
));
end generate;

GEN_DATL:
for i in 7 downto 0 generate
    DIRBUFL: nt02d5
        port map ( i => t_mpc_data_out(i), oen => all_rdl_n, z => mpc_data_out(i
));
end generate;

end uart_ir_ifc_hdl;
```

*ir_ifc.vhd*

```
-- file:      ir_rec.vhd
-- purpose:   InfraRed controller receive guts
-- Version:   1.0
-- created:   2/3/93
-- released:  7/18/93
-- author:    Gregg Lahti  |  VLSI Technology, PSD
-- modified:

library ieee;
library vlsipsd;
use ieee.std_logic_1164.all;
use ieee.std_logic_unsigned.all;
use vlsipsd.types_pkg.all;

entity ir_rec is
port (
    clk_in          : in  std_logic;
    mclkim          : in  std_logic;
    reset_n         : in  std_logic;
    irmod           : in  std_logic;
    demod           : in  std_logic;
    irurt           : in  std_logic;
    red             : in  std_logic;
    irin_toir       : in  std_logic;
    mod_clk         : in  std_logic;
    mod_clk_n       : in  std_logic;
    ire_reset_n     : in  std_logic;
    comena          : in  std_logic;
    ir_rec_mod      : out std_logic;
    ire             : out std_logic);
end ir_rec;

architecture ir_rec_hdl of ir_rec is

--signal defs signal clk                  : std_logic;
    signal irin                 : std_logic;
    signal countq               : std_logic_vector(3 downto 0);
    signal non_mui_enable       : std_logic;
    signal non_mui_enable_n     : std_logic;
    signal mui_decode_en        : std_logic;
    signal mui_decode_en_n      : std_logic;
    signal reset_start_n        : std_logic;
    signal uart_en              : std_logic;
    signal start_count          : std_logic;
    signal sync_reset_n         : std_logic;
    signal u_rec_bit_out        : std_logic;
    signal non_mui_in           : std_logic;
    signal mui_decode_in        : std_logic;
    signal irin_t               : std_logic;
    signal red_n, demod_n       : std_logic;

begin

--------------
```

*ir_rec.vhd*

```vhdl
--relationals
--------------- irin <= irin_toir;
red_n <= not red;
demod_n <= not demod;
non_mui_enable_n <= not non_mui_enable;
clk <= clk_in;

-------------------------------------------------------------
-- Decoding logic bits.  If redeye mode is set, everything
-- else is disabled (IRURT is a don't care).  When in IRURT
-- mode, DEMOD is used to determine if in non_mui_enable
-- mode (DEMOD=0) or if mui_decode_en (DEMOD=1) mode is
-- used.
------------------------------------------------------------- non_mui_enable <= irmod and irurt and demod_n and red_n;
mui_decode_en  <= irmod and irurt and demod and red_n;
uart_en <= (not irmod) and demod_n and irurt and red_n;
mui_decode_en_n <= not mui_decode_en;

-------------------------------------------------------------
-- Active low signals feeding into the AND function,
-- acts like a cheap mux.
------------------------------------------------------------- ir_rec_mod <= u_rec_bit_out and non_mui_in and mui_decode_in;

-------------------------------------------------------------
-- Gets the IRIN input and sets the IRE bit
-------------------------------------------------------------

IRE_BLK: block
    signal ire_re, ire_fe    : std_logic;
    signal irin_n            : std_logic;
    signal ire_t_reset_n     : std_logic;
begin ire <= ire_re or ire_fe;
    irin_n <= not irin;
    ire_t_reset_n <= reset_n and ire_reset_n;

IRIN_RE_PROC:
    process (irin, ire_t_reset_n)
    begin
        if ire_t_reset_n='0' then
            ire_re <= '0';
        elsif irin'event and irin='1' then
            ire_re <= '1' after 1 ns;
        end if;
    end process;

IRIN_FE_PROC:
    process (irin_n, ire_t_reset_n)
    begin
        if ire_t_reset_n='0' then
            ire_fe <= '0';
        elsif irin_n'event and irin_n='1' then
            ire_fe <= '1' after 1 ns;
``` ir_rec.vhd

```vhdl
        end if;
    end process;

end block IRE_BLK;

------------------------------------------------------
-- Non-modulated IR receive block .  Pass whatever
-- the irin signal is to the UART, no decoding
-- (DEMOD=0) for this to be used.
------------------------------------------------------

NOMOD_IR_MODE: block
begin
    process (non_mui_enable, irin)
    begin
        if non_mui_enable='1' then
            non_mui_in <= irin;
        else
            non_mui_in <= '1';
        end if;
    end process;

end block NOMOD_IR_MODE;

-------------------------------
-- Modulated IR receive block
-------------------------------

MOD_IR_MODE: block
    signal irin_s_in            : std_logic;
    signal mod_irin_sync        : std_logic;
    signal mui_decode_in_t      : std_logic;
    signal t1, t2, t3, t4       : std_logic;
    signal ta, tb               : std_logic;
    signal te, tf               : std_logic;
    signal tg, th               : std_logic;
begin ------------------------------------------------------------------
    -- MOD_SYNC1 and MOD_SYNC2 super-synchronize the IR input.
    -- The IRIN block and SYNC1-2 will hold the incoming IR pulse,
    -- MOD1-4 generates the pulse-stretching and decoding of the
    -- 500kHz sample.  Note that the sample will be stretched by
    -- a 1/2 1 MHz clock pulse due to sampling distortion. (I
    -- could fix this, but it would require a more gates at 14 MHz).
    -- Signal mui_in will be inverted and sent to the UART.
    ------------------------------------------------------------------

MOD_SYNC1: process (reset_n, clk)
    begin
        if reset_n='0' then
            mod_irin_sync <= '0';
        elsif clk'event and clk='1' then
            if mui_decode_en='1' then
                mod_irin_sync <= irin after 1 ns;
            else
                mod_irin_sync <='0' after 1 ns;
            end if;
        end if;
```

*Ir_rec.vhd*

```vhdl
end process;

MOD_SYNC2: process (reset_n, clk)
begin
    if reset_n='0' then
        irin_s_in <= '0';
    elsif clk'event and clk='1' then
        irin_s_in <= mod_irin_sync after 1 ns;
    end if;
end process;

MOD_1: process (mclklm, reset_n)
begin
    if reset_n='0' then
        t1 <= '1';
    elsif mclklm'event and mclklm='1' then
        t1 <= irin_s_in after 1 ns;
    end if;
end process;

MOD_2: process (mclklm, reset_n)
begin
    if reset_n='0' then
        t2 <= '0';
    elsif mclklm'event and mclklm='1' then
        t2 <= not t1 after 1 ns;
    end if;
end process;

MOD_3: process (mclklm, reset_n)
begin
    if reset_n='0' then
        t3 <= '1';
    elsif mclklm'event and mclklm='1' then
        t3 <= not irin_s_in after 1 ns;
    end if;
end process;

MOD_4: process (mclklm, reset_n)
begin
    if reset_n='0' then
        t4 <= '0';
    elsif mclklm'event and mclklm='1' then
        t4 <= not t3 after 1 ns;
    end if;
end process;

MOD_A: process (mclklm, reset_n)
begin
    if reset_n='0' then
        te <= '0';
    elsif mclklm'event and mclklm='1' then
        te <= ta after 1 ns;
    end if;
end process;

MOD_B: process (mclklm, reset_n)
begin
    if reset_n='0' then
        tg <= '0';
    elsif mclklm'event and mclklm='1' then
```

*ir_rec.vhd*

```
            tg <= tb after  1e;
        end if;
    end process;

ta <= t1 and t2;
    tb <= t3 and t4;
    tf <= te or ta;
    th <= tb or tg;
    mui_decode_in_t <= not (tf or th);

MOD_OUT: process (mclk1m, reset_n)
    begin
        if reset_n='0' then
            mui_decode_in <= '0';
        elsif mclk1m'event and mclk1m='1' then
            mui_decode_in <= mui_decode_in_t after 1 ns;
        end if;
    end process;

end block MOD_IR_MODE;

------------------------------
-- IR UART Receiver block.
------------------------------

UART_MODE: block
    signal irin_sync, irin_t1_unsync    : std_logic;
    signal u_rec_bit                    : std_logic;
begin ---------------------------------
    -- Sync input For the UART Block
    ---------------------------------

SYNC_LAT:
    process (mod_clk, reset_n, comena, irin_t)
    begin
        if reset_n='0' or comena='0' then
            irin_t1_unsync <= '0';
        elsif mod_clk='1' then
            irin_t1_unsync <= irin_t after 1 ns;
        end if;
    end process;

SYNC_FLP:
    process (mod_clk, reset_n, comena)
    begin
        if reset_n='0' or comena='0' then
            irin_sync <= '0';
        elsif mod_clk'event and mod_clk='1' then
            irin_sync <= irin_t1_unsync after 1 ns;
        end if;
    end process;

----------------------------------------------------------
    -- Decoder for IR input function in generic uart mode.
    -- A 3/16 bit-width "1" to the irin will be stretched
    -- 16 baudclk's, inverted, and sent to the UART.
    ----------------------------------------------------------
```

*ir_rec.vhd*

```vhdl
IR_UART_SM:
process (reset_n, mod_c   uart_en, irin_sync, countq)
begin
    if reset_n='0' then
        u_rec_bit <= '1';
        reset_start_n <= '1';
        start_count <= '0';
        sync_reset_n <= '1';
    elsif mod_clk'event and mod_clk='1' then
        if uart_en='1' then
            if irin_sync='1' or countq > "0111" then
                u_rec_bit <= '0' after 1 ns;
                start_count <= '1' after 1 ns;
                if countq = "1000" then
                    reset_start_n <= '0' after 1 ns;
                elsif countq="1111" then
                    sync_reset_n <= '0' after 1 ns;
                else
                    sync_reset_n <= '1' after 1 ns;
                    reset_start_n <= '1' after 1 ns;
                end if;
            else
                sync_reset_n <= '1' after 1 ns;
                start_count <= '0' after 1 ns;
                u_rec_bit <= '1' after 1 ns;
                reset_start_n <= '1' after 1 ns;
            end if;
        else
            sync_reset_n <= '1' after 1 ns;
            start_count <= '0' after 1 ns;
            reset_start_n <= '1' after 1 ns;
            u_rec_bit <= '1' after 1 ns;
        end if;
    end if;
end process;

U_REC_BIT_PROC:
process (mod_clk, reset_n)
begin
    if reset_n='0' then
        u_rec_bit_out <= '1';
    elsif mod_clk'event and mod_clk='1' then
        u_rec_bit_out <= u_rec_bit after 1 ns;
    end if;
end process;

end block UART_MODE;

-----------------------------------------------------
-- Receiver section which captures the rising edge
-- of irin.  Receiver flop is held reset during
-- non-modulated input (DEMOD=0) and redeye (RED=1)
-- mode.
-----------------------------------------------------

IRIN_BLK: block
    signal input_reset_n    : std_logic;
    signal input_en         : std_logic;
begin
```

*ir_rec.vhd*

```vhdl
        input_en <= uart_en;
        input_reset_n <= (reset_rt_n and reset_n and
                         mui_de_de_en_n and red_n and
                         non_mui_enable_n);

------------------------------
    -- Get first edge of transaction
    ------------------------------

IRIN_T_PROC:
        process (irin, input_reset_n, input_en)
        begin
            if input_reset_n='0' then
                irin_t <= '0';
            elsif irin'event and irin='1' then
                if input_en='1' then
                    irin_t <= '1' after 1 ns;
                end if;
            end if;
        end process;

end block IRIN_BLK;

------------------------------
    -- 16 position (4 bit) counter
    -- sync and async resettable
    ------------------------------

REC_COUNT_BLK: block
        signal countq_next      : std_logic_vector(3 downto 0);
    begin IR_COMB_COUNT_PROC:
        process(sync_reset_n, countq)
            variable countq_next_var : std_logic_vector(3 downto 0);
        begin
            if sync_reset_n ='0' then
                countq_next_var := "0000";
            else
                countq_next_var := countq + "0001";
            end if;
            countq_next <= countq_next_var;
        end process;

IR_COUNTER_PROC:
        process(mod_clk_n, start_count, reset_n)
        begin
            if reset_n='0' or start_count='0' then
                countq <= "0000";
            elsif mod_clk_n'event and mod_clk_n='1' then
                countq <= countq_next after 1 ns;
            end if;
        end process;

end block REC_COUNT_BLK;

end ir_rec_hdl;
```

*ir_rec.vhd*

```
--------------------------------------------------------------
-- file:        ir_xmit.vhd
-- purpose:     InfraRed contro  ,r transmit guts
-- Version:     1.0
-- created:     2/3/93
-- released:    7/18/93
-- author:      Gregg Lahti  |  VLSI Technology, PSD
-- modified:
-------------------------------------------------------------- library ieee;
library vlsipsd;
use ieee.std_logic_1164.all;
use ieee.std_logic_unsigned.all;
use vlsipsd.types_pkg.all;

entity ir_xmit is
port (
    clk32k          : in  std_logic;
    mclk500k        : in  std_logic;
    red             : in  std_logic;
    irmod           : in  std_logic;
    lbr_bit         : in  std_logic;
    redeye_busy     : in  std_logic;
    reset_n         : in  std_logic;
    mod_clk         : in  std_logic;
    mod_clk_n       : in  std_logic;
    uart_sout       : in  std_logic;
    irurt           : in  std_logic;
    ir_xmit_out     : out std_logic;
    redeye_done     : out std_logic);
end ir_xmit;

architecture ir_xmit_hdl of ir_xmit is

--signal defs
    signal ir_mod_out, uart_mode_out  : std_logic;
    signal countq, countq_next        : std_logic_vector(3 downto 0);
    signal redeye_out                 : std_logic;
    signal redeye_xmit                : std_logic;
    signal uart_en                    : std_logic;
    signal mui_enable                 : std_logic;
    signal clk32k_n                   : std_logic;
    signal t_mod_clk, t_mod_clk_n     : std_logic;

begin clk32k_n    <= not clk32k;
    ir_xmit_out <= ir_mod_out or redeye_out or uart_mode_out;
    mui_enable  <= irmod and irurt and (not uart_sout) and (not red);
    uart_en     <= irurt and (not irmod) and (not uart_sout) and (not red);

----------------------------------------------------------
    -- Modulated UART transfer mode.  Using clk500k
    -- as a base freqency for modulation, create a 50%
    -- duty cycle
    ----------------------------------------------------------
```

*ir_xmit.vhd*

```vhdl
ir_mod_out <= mclk500k and mui_enable;

-------------------------------------------------
-- Cheating mux so that we can run the bit counter
-- at 32khz as well as the baudout_n frequency
-------------------------------------------------

MOD_CLK_MUX: process (red, mod_clk_n, mod_clk, clk32k, clk32k_n)
begin
    if red='1' then
        t_mod_clk <= clk32k;
        t_mod_clk_n <= clk32k_n;
    else
        t_mod_clk <= mod_clk;
        t_mod_clk_n <= mod_clk_n;
    end if;
end process;

-------------------------------------------------
-- Redeye transfer block.  Based on the
-- 32kHz clock input and the redeye_busy
-- input.
-------------------------------------------------

RED_EYE_BIT: block
begin
    redeye_out <= (not clk32k) and redeye_xmit;

RED_EYE_SM:
    process (clk32k, redeye_busy, lbr_bit, reset_n, countq)
    begin
        if reset_n='0' then
            redeye_xmit <= '0' after 1 ns;
            redeye_done <= '0' after 1 ns;
        elsif clk32k'event and clk32k='1' then
            redeye_xmit <= '0' after 1 ns;
            redeye_done <= '0' after 1 ns;
            if redeye_busy='1' then         -- lbr_bit & red=1
                if countq > "0000" and countq < "1001" then
                    redeye_xmit <= lbr_bit after 1 ns;
                elsif countq = "1110" then
                    redeye_done <= '1' after 1 ns;
                    redeye_xmit <= '0' after 1 ns;
                else
                    redeye_xmit <= '0' after 1 ns;
                    redeye_done <= '0' after 1 ns;
                end if;
            else
                redeye_xmit <= '0' after 1 ns;
                redeye_done <= '0' after 1 ns;
            end if;
        end if;
    end process;
end block RED_EYE_BIT;

-------------------------------------------------
-- UART transfer mode.  Using mod_clk (rclk16x) as a basis
```

*ir_xmit.vhd*

```
-- to count clocks and transmit accordingly.
----------------------------      ----------------------------

UART_MODE: block
begin

UART_ENCODER:
    process (countq, uart_en)
    begin
        if uart_en='1' then
            if countq > "0111" and countq < "1011"then
                uart_mode_out <= '1' after 1 ns;
            else
                uart_mode_out <= '0' after 1 ns;
            end if;
        else
            uart_mode_out <= '0' after 1 ns;
        end if;
    end process;
end block UART_MODE;

-----------------------------------------------
-- universal counter block for bit counts
-----------------------------------------------

XMIT_COUNT_BLK: block
    signal reset_temp_n     : std_logic;
begin

XMT_COMB_CKT:
    process(countq)
        variable countq_next_var : std_logic_vector(3 downto 0);
    begin
        if countq = "1111" then
            countq_next_var := "0000";
        else
            countq_next_var := countq + "0001";
        end if;
        countq_next <= countq_next_var;
    end process;

reset_temp_n <= (redeye_busy or uart_en) and reset_n;

XMT_COUNTER_PROC:
    process(t_mod_clk_n, reset_temp_n, reset_n)
    begin
        if reset_temp_n='0' then
            countq <= "0000";
        elsif t_mod_clk_n'event and t_mod_clk_n='1' then
            countq <= countq_next after 1 ns;
        end if;
    end process;

end block XMIT_COUNT_BLK;

end ir_xmit_hdl;
```

*ir_xmit.vhd*

We claim:

1. An input/output interface comprising:

serial data stream logic for producing an outgoing serial data stream and for processing an incoming serial data stream;

a serial data port for transmitting and receiving data over a serial data transmission medium;

infrared encode logic for encoding data for transmission by infrared light;

infrared decode logic for decoding data received by infrared light; and, first selection logic, connected to the serial data port, the infrared encode logic and the infrared decode logic, for directing the outgoing serial data stream to the serial data port or to the infrared encode logic and for directing data received over the serial data transmission medium and decoded data received by infrared light to the serial data stream logic; wherein the first selection logic is separate from the serial data stream logic and receives from the serial data stream logic the outgoing serial data stream.

2. An input/output interface as in claim 1 wherein the infrared encode logic includes means for transmission by infrared light using a plurality of modes.

3. An input/output interface as in claim 2 wherein the plurality of modes includes a serial data stream transmission mode and a REDEYE transmission only mode.

4. An input/output interface as in claim 3 wherein the plurality of modes also includes a modulated serial data stream mode.

5. An input/output interface as in claim 4 wherein the plurality of modes also includes a software control user-defined mode.

6. An input/output interface comprising:

serial data stream logic for producing an outgoing serial data stream and for processing an incoming serial data stream;

infrared encode logic for encoding data for transmission by infrared light, including means for transmission by infrared light using a plurality of modes, wherein the plurality of modes includes a serial data stream transmission mode and a REDEYE transmission only mode; and, infrared decode logic for decoding data received by infrared light.

7. An input/output interface as in claim 6 wherein the plurality of modes also includes a modulated serial data stream mode.

8. An input/output interface as in claim 7 wherein the plurality of modes also includes a software control user-defined mode.

9. A method for transmitting data by infrared light comprising the steps of:

(a) selecting an encoding mode from a plurality of encoding modes for infrared light transmission;

(b) producing an outgoing serial data stream;

(c) transmitting the serial data stream by infrared light using a first format when a first mode from the plurality of modes is selected in step (a); and, (d) transmitting the serial data stream by infrared light using a second format when a second mode from the plurality of modes is selected in step (a);

wherein the second mode is REDEYE transmission using a REDEYE format.

10. A method as in claim 9 wherein in step (c) the first mode is serial data stream transmission wherein an infrared light pulse is transmitted for each bit of data having a first value.

11. A method as in claim 9 wherein in step (c) the first mode is modulated serial data stream transmission wherein a modulated infrared light pulse is transmitted for each bit of data having a first value.

12. A method as in claim 9 additionally comprising the steps of:

(e) transmitting the serial data stream by infrared light using a third format third a first mode from the plurality of modes is selected in step (a); and, (f) transmitting the serial data stream by infrared light using a fourth format when a fourth mode from the plurality of modes is selected in step (a).

13. A method as in claim 12 wherein in step (f) the fourth mode is a format defined by a user in software.

14. A method as in claim 13 wherein in step (c) the first mode is serial data stream transmission wherein an infrared light pulse is transmitted for each bit of data having a first value.

15. A method as in claim 13 wherein in step (c) the first mode is modulated serial data stream transmission wherein a modulated infrared light pulse is transmitted for each bit of data having a first value.

* * * * *